(12) United States Patent
Liepa et al.

(10) Patent No.: US 7,920,140 B2
(45) Date of Patent: Apr. 5, 2011

(54) SYSTEM FOR CONTROLLING DEFORMATION

(75) Inventors: Peter Egils Liepa, Toronto (CA); Vincent Chi Hang Ma, Ontario (CA)

(73) Assignee: Autodesk, Inc., San Rafael, CA (US)

( * ) Notice: Subject to any disclaimer, the term of this patent is extended or adjusted under 35 U.S.C. 154(b) by 1100 days.

(21) Appl. No.: 11/391,178

(22) Filed: Mar. 29, 2006

(65) Prior Publication Data

US 2007/0229543 A1 Oct. 4, 2007

(51) Int. Cl.
*G06T 15/00* (2011.01)
(52) U.S. Cl. ........ 345/420; 345/419; 345/441; 345/581; 345/646
(58) Field of Classification Search .................. 345/419, 345/420, 441, 581, 646, 647
See application file for complete search history.

(56) References Cited

U.S. PATENT DOCUMENTS

| | | | |
|---|---|---|---|
| 5,566,281 A * | 10/1996 | Tokumasu et al. | 345/420 |
| 6,204,860 B1 | 3/2001 | Singh | |
| 6,256,038 B1 * | 7/2001 | Krishnamurthy | 345/419 |
| 6,271,856 B1 * | 8/2001 | Krishnamurthy | 345/581 |
| 6,281,905 B1 * | 8/2001 | Massabo et al. | 345/427 |
| 6,525,735 B1 | 2/2003 | Maillot | |
| 6,608,631 B1 | 8/2003 | Milliron | |
| 6,639,592 B1 * | 10/2003 | Dayanand et al. | 345/419 |
| 7,230,620 B2 * | 6/2007 | Pfister et al. | 345/426 |
| 7,286,127 B2 * | 10/2007 | Zhou et al. | 345/420 |

OTHER PUBLICATIONS

Karen Singh et al., "Wires: A Geometric Deformation Technique", Paper, Alias|wavefront, Toronto, Canada.
D. W. Eggert et al., "Estimating 3-D Rigid Body Transformations: A Comparison of Four Major Algorithms", Machine Vision and Applications, Springer-Verlag, 1997.
Tim Milliron et al., "A Framework for Geometric Warps and Deformations", ACM Transactions on Graphics, vol. 21, No. 1, Jan. 2002, pp. 20-51.
Seungyong Lee et al., "Image Metamorphosis with Scattered Feature Constraints", IEEE Transactions on Visualization and Computer Graphics, vol. 2, No. 4, Dec. 1996, pp. 337-354.
Mario Botsch et al., "Real-Time Shape Editing using Radial Basis Functions", Eurographics, vol. 24, No. 3, 2005.
A. Lorusso et al., "A Comparison of Four Algorithms for Estimating 3-D Rigid Transformations", Paper, British Machine Vision Conference.

* cited by examiner

*Primary Examiner* — Phu Nguyen
(74) *Attorney, Agent, or Firm* — Staas & Halsey LLP

(57) ABSTRACT

A system or tool kit is provided that allows a user to specify a deformation for a model. When the deformation produces anomalies the user can select functions or solutions from the tool kit to be executed that correct the anomalies. When the effect of a warp or deformation extends into a region outside a user specified constraint, a clamp function can be selected from the kit to stop the effect outside of the constraint. When a constraint causes the transition from a warp to a non-warp region to result in a sharp transition a tangent continuous transition function can be applied from the kit. When contradictory modifiers and constraints cause unexpected excursions in the warped model, samples with outlier Laplacians can be culled. When the model includes rigid objects, the motion of the rigid objects can be used as a modifier to allow the rigid objects to move with the deformed model without being deformed.

8 Claims, 36 Drawing Sheets

SYSTEM FOR CONTROLLING DEFORMATION

BACKGROUND OF THE INVENTION

1. Field of the Invention

The present invention is directed to a system and method that allows a user to specify a deformation of a model and control that deformation based on conditions associated with the model or specified by the user for the model.

2. Description of the Related Art

In performing feature-based deformation of models, such as in the modeling of an automobile, it is often necessary to deal with anomalies that occur in the deformation. What is needed is a set of tools that allow a user to solve the problems associated with these anomalies.

SUMMARY OF THE INVENTION

It is an aspect of the present invention to provide a set of tools that allow a user to fix anomalies that occur during model deformation.

The above aspect can be attained by a system that allows a user to specify a deformation for a model. When the deformation produces anomalies the user can select functions to be executed that correct the anomalies. When the effect of a warp or deformation-extends into a region outside a user specified constraint, a clamp function can be selected to stop the effect outside of the constraint. When a constraint causes the transition from a warp to a non-warp region to result in a sharp transition, a tangent continuous transition function can be applied. When contradictory modifiers and constraints cause unexpected excursions in the warped model, samples with outlier Laplacians can be culled. When the model includes rigid objects, the motion of the rigid objects can be used as a modifier to augment the deformation so that the deformed model matches seamlessly with the moved rigid objects.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

In a model deformation workflow, a mapping is defined that associates each point in space with a displacement vector. This mapping is used to transform objects such as points, curves and surfaces in space. To deform a model, each point on the model is moved by its associated displacement vector.

Figure 1:
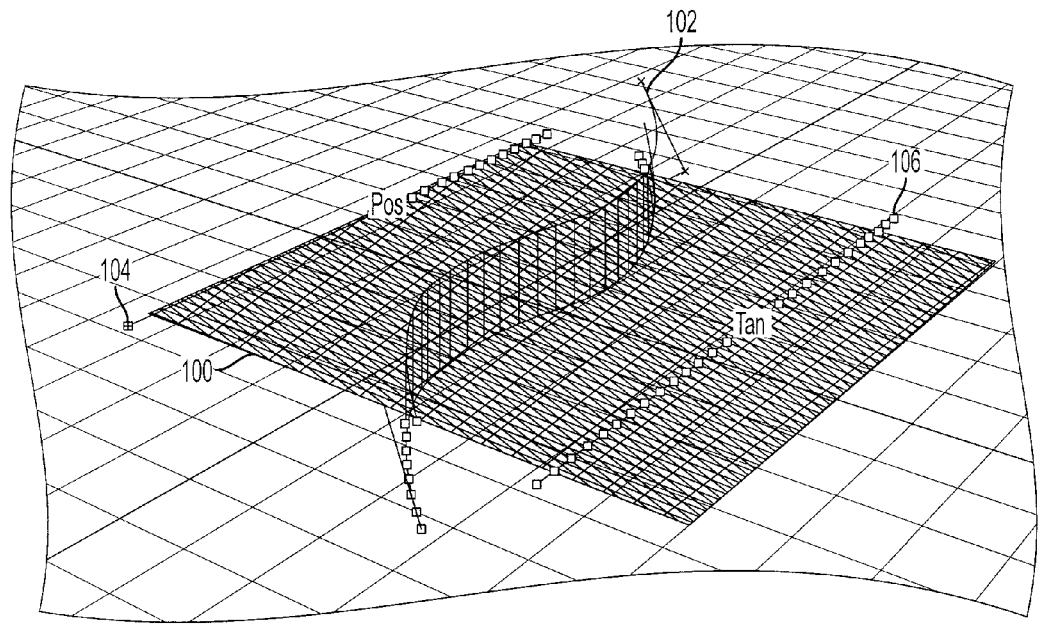
FIGS. 1-3 depict a simple deformation, an unwanted effect, and the deformation with clamping.

To define a deformation, the user specifies two kinds of data—modifiers and constraints. Both kinds can take the form of loci such as points, curves, or surfaces. A modifier indicates that the deformation is to take a specified origin locus to a specified destination locus. There are two kinds of constraints: a positional constraint indicates that the deformation should not move points on the constraint locus, while a tangential constraint indicates that the deformation should leave both position and orientation unchanged on the constraint locus. Modifiers and constraints are sampled, and a deformation vector is computed for each sample. For constraint samples the deformation vector is zero. For modifier samples the deformation vector is the difference between origin and destination samples. The deformation on the entire space is then computed so as to interpolate or approximate the deformation sample vectors. This can be done, for example, by using radial basis function interpolation, or least squares approximation via a volume spline hierarchy, or a system of partial differential equations. An object that is to be deformed is called a target. FIG. 1 illustrates a simple deformation setup. A target planar mesh 100 is to be deformed according to modifier 102 going through it. Origin and destination curves are shown. Two constraint lines 104 and 106 are positioned near the left and right boundaries.

Figure 2:
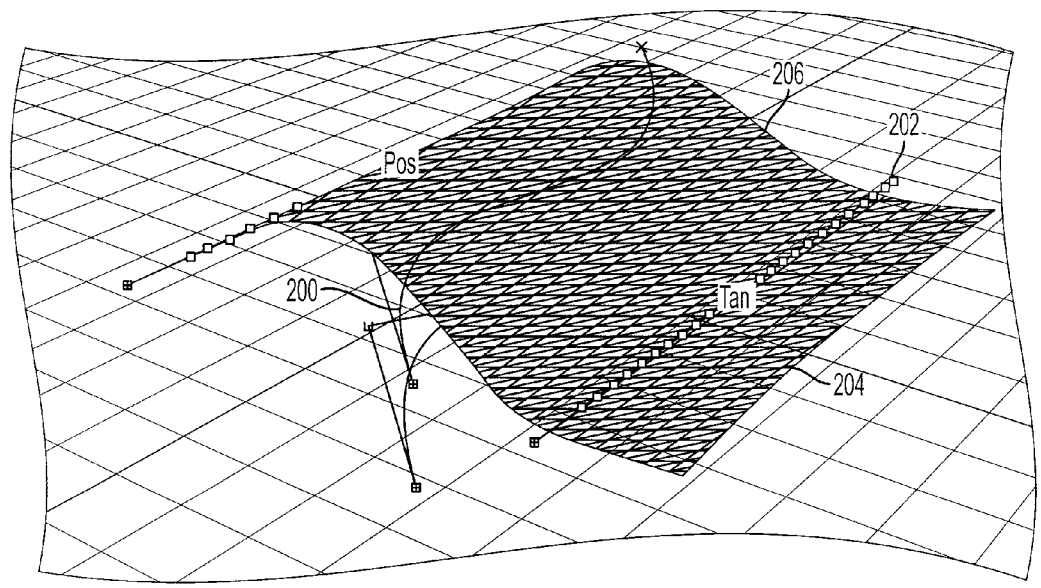

One problem is that, while the interpolation/approximation smoothly interpolates a deformation between modifiers and constraints, the interpolation/approximation creates a global deformation that, in particular, extends beyond the constraints. FIG. 2 illustrates that the deformation 200 preserves the original mesh position and normal/tangent plane along the constraint 202 on the right. But the deformation also has an unwanted effect beyond the constraint toward the right boundary 204 of the mesh 206. This is a problem because the user typically intends that the constraints define the boundary of a deformation, and expects the deformation to have no effect beyond those boundaries. The problem is complicated by the fact that in most cases the constraints do not divide space into "inside" and "outside" regions (even though they may so divide a specific model on which they lie).

A solution to this problem is to supplement deformations with clamping. This solution computes a secondary scalar spatial function—called the "clamp" function. It has a value of: "1" on modifiers and "0" on constraints and "−1" on clampers (clampers will be discussed below). An interpolation/approximation is computed over all space, using methods similar to those for the deformation (e.g. radial basis functions or hierarchical volume splines).

Figure 3:
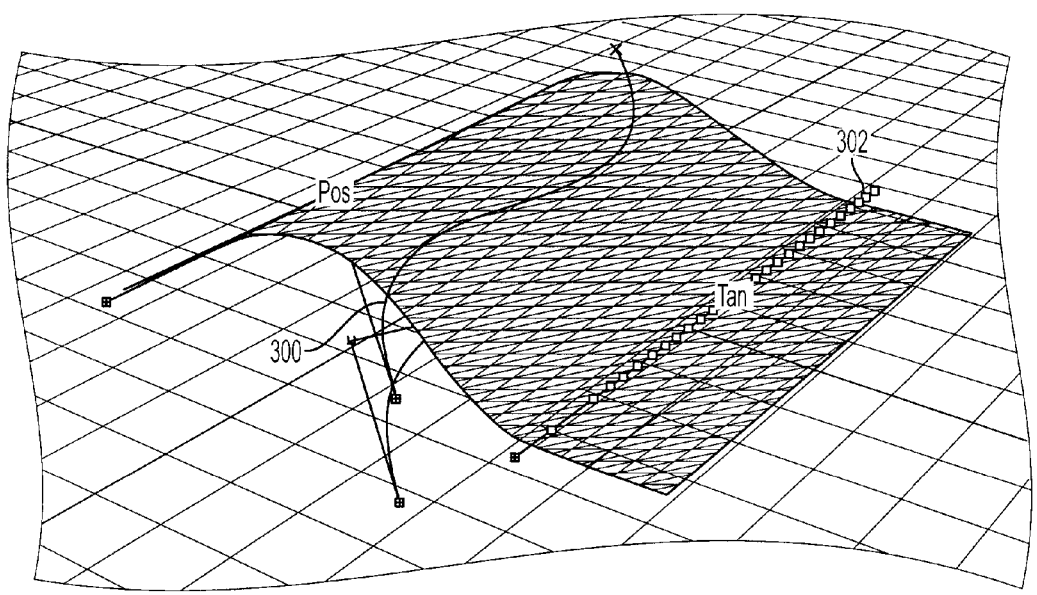

When the deformation is evaluated at a point, it is set to zero if the clamp function at that point is less than zero. A region in which the clamp function is less than zero is called a clamping region. FIG. 3 illustrates the same deformation 300, but with clamping turned on. Now the deformation has no effect to the right of the constraint line 302.

In a preferred implementation, the interpolation of the clamp function should be as "linear" as possible. For example, if you are using radial basis functions, the basis functions should be linear. If you are using volume splines, the splines should be linear.

Sometimes the clamping scheme does not disable the deformation in all regions that the user may wish. By adding additional clampers (usually isolated points), the clamping regions can be enlarged.

The clamp function will be discussed in more detail later herein.

Figure 4:
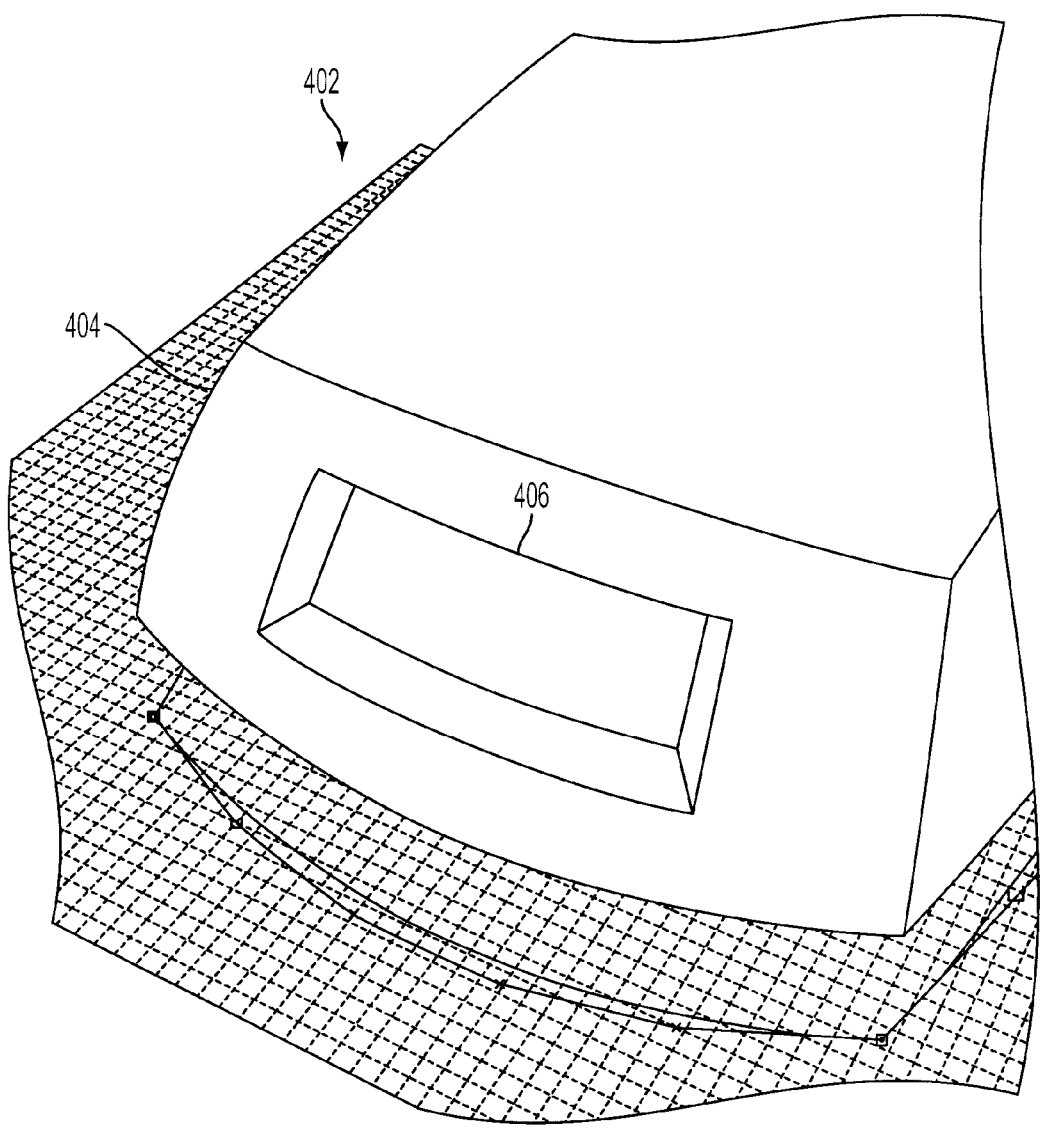
FIGS. 4-6 show a model, an unwanted effect and a solution for rigid objects.
Figure 5:
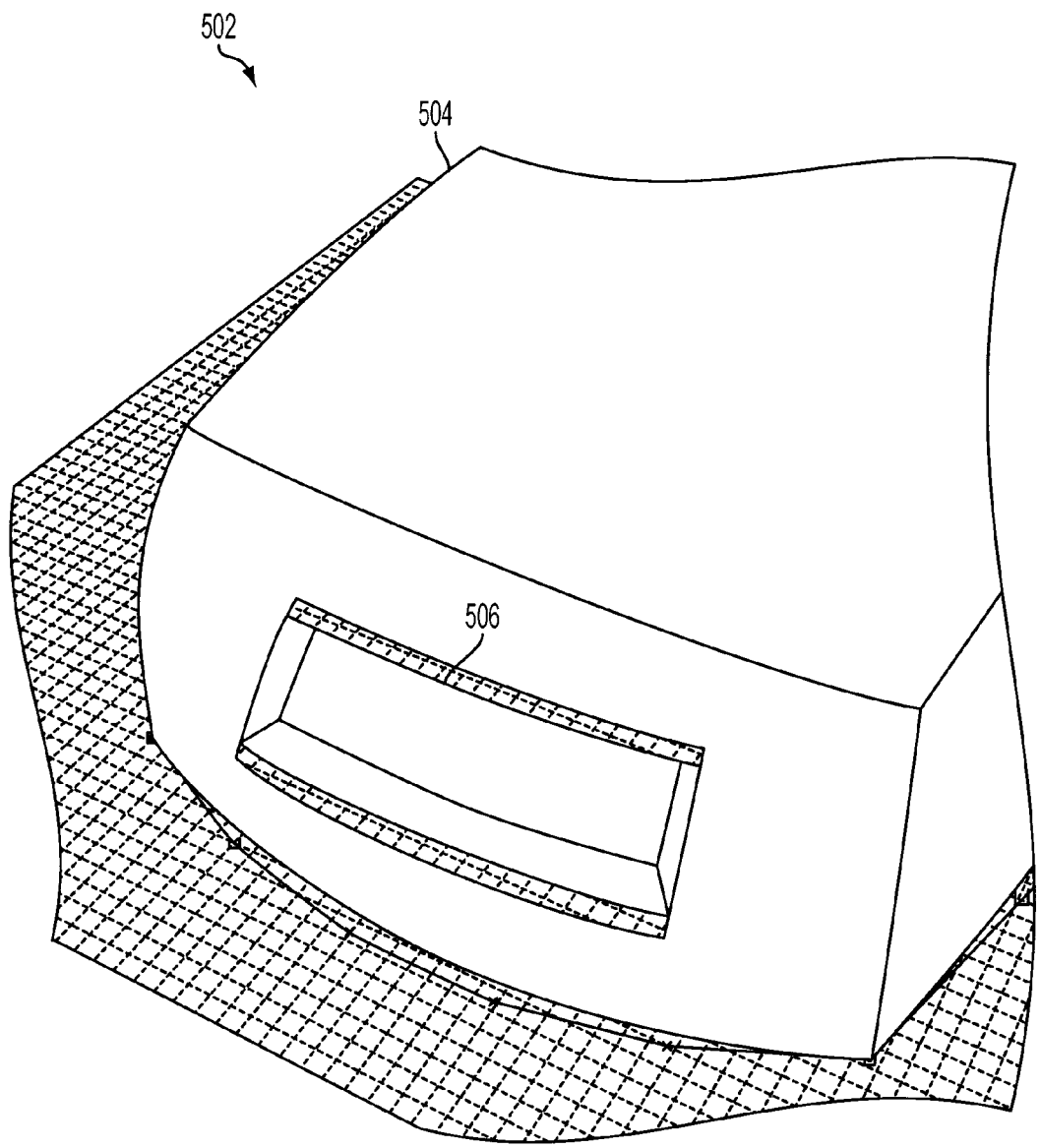

One application of deformation technology is design modification and iteration for automotive and industrial design. In these realms, some parts of a design are flexible (i.e. subject to deformation), while others are constrained to be rigid (e.g. a headlight assembly in an otherwise flexible car hood, or a gas cap on the otherwise flexible side of a car). Sometimes constraints are a combination of rigid and flexible—e.g. two lines are constrained to be 3 mm apart, but are otherwise flexible (think of a ribbon, or a cut line for a car door). FIG. 4 depicts a model 402 that could be a model of a vehicle part such as a passenger enclosure 404 with a cutout or window 406 prior to deformation. FIG. 5 shows the model 502 after deformation where the bottom has been dragged down to make the enclosure taller. The rigid window 506 has separated from the rest of the enclosure 504. This is a problem.

Figure 6:
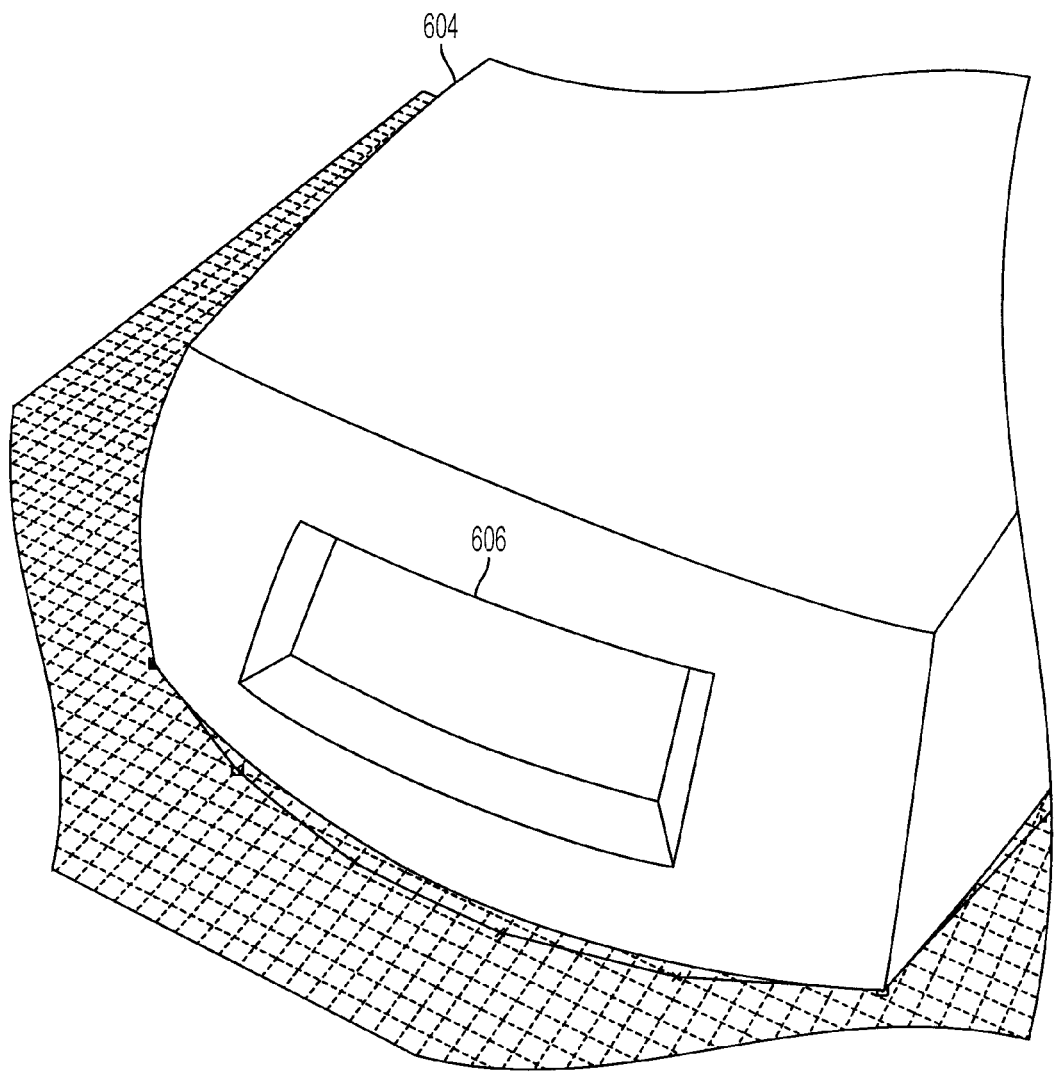

A solution to this problem is to provide deformation-derived movements of the rigid object. In this solution, the rigid object is sampled, and the warp is applied to the samples. Then, a transformation including of a rotation and translation is computed that best approximates the effect of the warp on the samples, in a least squares sense. Then, a new spatial warp is computed, using the rigid object and its transformation as an additional origin/destination modifier pair. FIG. 6 illustrates a new deformation that modifies the enclosure seamlessly with a rigidly transformed window 606.

If there are multiple rigid objects, the above enhancements are carried out for all the objects to create a new warp. One transformation is calculated for each group of objects that are to move as a group.

Some rigid objects or rigid object groups may be constrained to translate only or rotate only, if the design requires. Some rigid objects or rigid object groups may be further constrained to translate or rotate in specified directions, if the design requires.

The method may be extended to handle situations where objects are required to maintain certain properties. In the case of rigid objects, the property in question is shape. But other examples of properties might be volume or distance to another object or contact with another object. The set of all objects with a given property is called an admissible set. A member of an admissible set is called an admissible object. In a deformation scenario, an object which is to maintain or achieve a given property is called a pre-admissible object. In the extended method, a pre-admissible object is deformed under a warp. Then, the element of the admissible set that is closest or approximately closest (in terms of the aforementioned properties) to the deformed pre-admissible object is computed. Then, a new warp is computed, using as an additional origin/destination modifier pair the pre-admissible object and the element of the admissible set that is closest to the deformed pre-admissible object. This new warp is applied to the non-pre-admissible objects, while the pre-admissible object is replaced by its corresponding admissible object. This method can be used, for example, to cause a curve or object to move along another curve (like curtain rings along a curved curtain rod), or cause a curve or object to maintain a constant distance from another curve that is being deformed (such as the two edges of a ribbon) while otherwise following a given deformation. Meanwhile the non-pre-admissible objects are deformed in a manner that seamlessly matches the deformations of the pre-admissible objects. The concept of finding a closest point in an admissible set is familiar from the field of geometric numerical integration, where the state of a mechanical system (e.g. a double pendulum) must be kept within a configuration space (see, for example, Section IV.4 of "Geometric Numerical Integration" by E. Hairer, C. Lubich, G. Wanner, Springer-Verlag, 2002.)

Additional details of the derived transformations will be discussed later herein.

Figure 7:
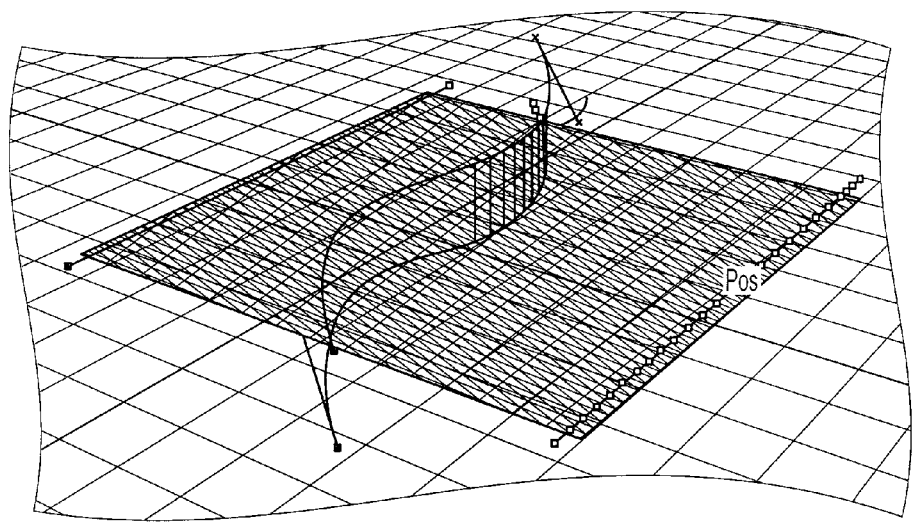
FIGS. 7-9 illustrate a simple deformation, an unwanted effect, and the deformation with a tangent constraint.
Figure 8:
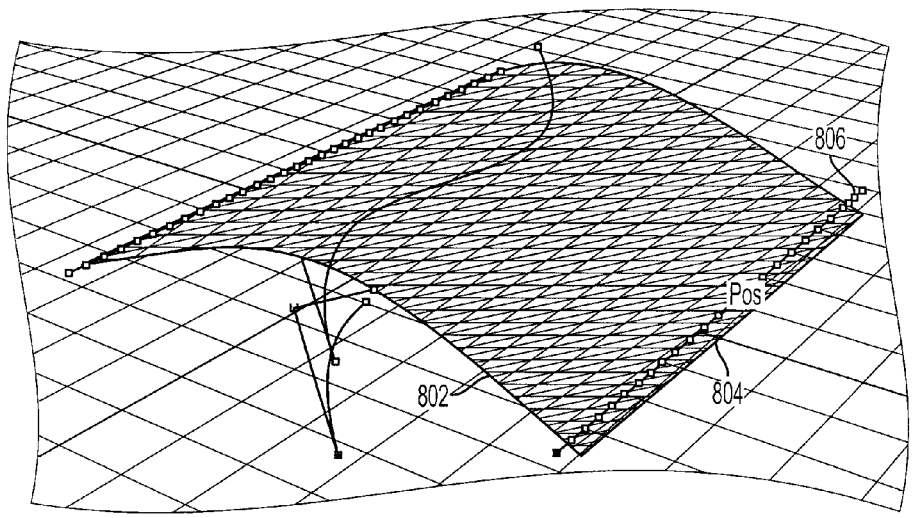

Another problem with the deformation of the entire space is that while the interpolation/approximation handles positional data, it does not handle differential data. In particular, conventional methods do not give a way of "holding" surface normals (i.e. tangent planes) at constraints. This is a problem because constraints usually define the boundary of a deformation, and the user will usually require that the deformed portion of the model blend smoothly with the (undeformed) remainder of the model. This is depicted in FIGS. 7 and 8. FIG. 7 depicts a setup similar to that in FIG. 1. In FIG. 8 the deformation has been applied. As can be seen, the surface orientation along the constraint lines has changed (i.e. the surface normals have changed direction). See also FIGS. 27-31 for another example.

A solution to this problem is to provide tangent continuous deformations. In this solution a secondary scalar spatial function—called the "fade" function is computed. It has a value of: "1" on modifiers; "0" on constraints where tangent continuity is to be preserved; "1" on remaining constraints. An interpolation/approximation is computed over all space, using methods similar to those for the deformation (e.g. radial basis functions or hierarchical volume splines).

Figure 9:
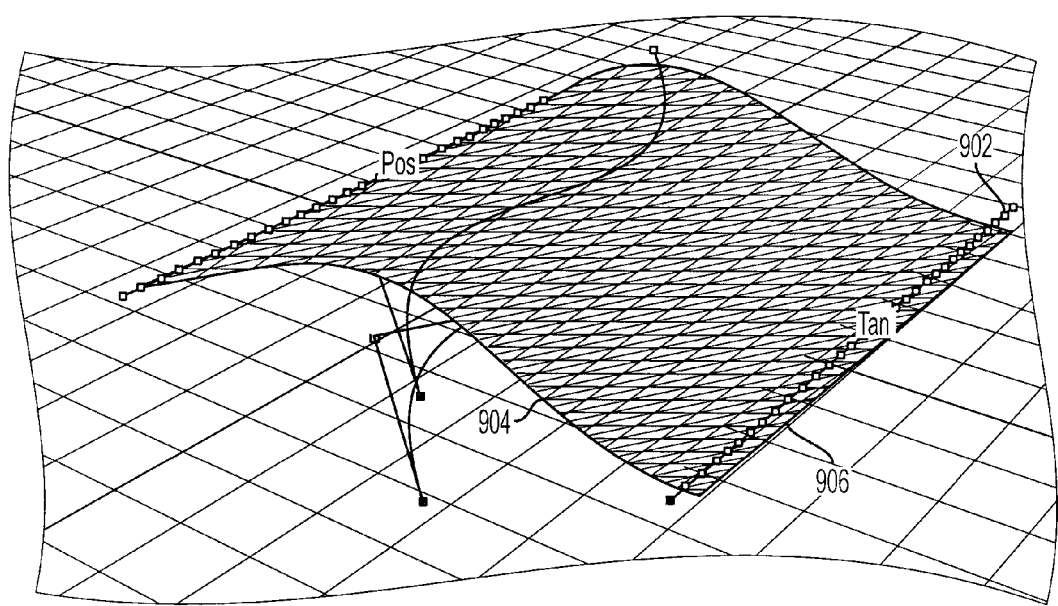

When the deformation is evaluated at a point, it is multiplied by the fade function at that point. It can be shown mathematically that the resultant deformation has no effect on normals on the designated constraints—this is basically due to the product rule in elementary differential calculus: $(fg)'=f'g+fg'=f'0+0g'=0$, where f and g are the fade and deformation functions respectively. In FIG. 9 the deformation in FIG. 7 has been applied. The constraint 902 on the right is a tangential constraint. As can be seen the surface orientation along constraint 902 is the same as prior to the deformation.

In a preferred implementation, the interpolation of the fade function should be as "linear" as possible. For example, if you are using radial basis functions, the basis functions should be linear. If you are using volume splines, the splines should be linear.

The scheme can be "tweaked" to get other boundary transition behaviors such curvature continuity and order-n continuity.

Additional details of the tangent continuous constraint transformations will be discussed later herein.

Figure 10:
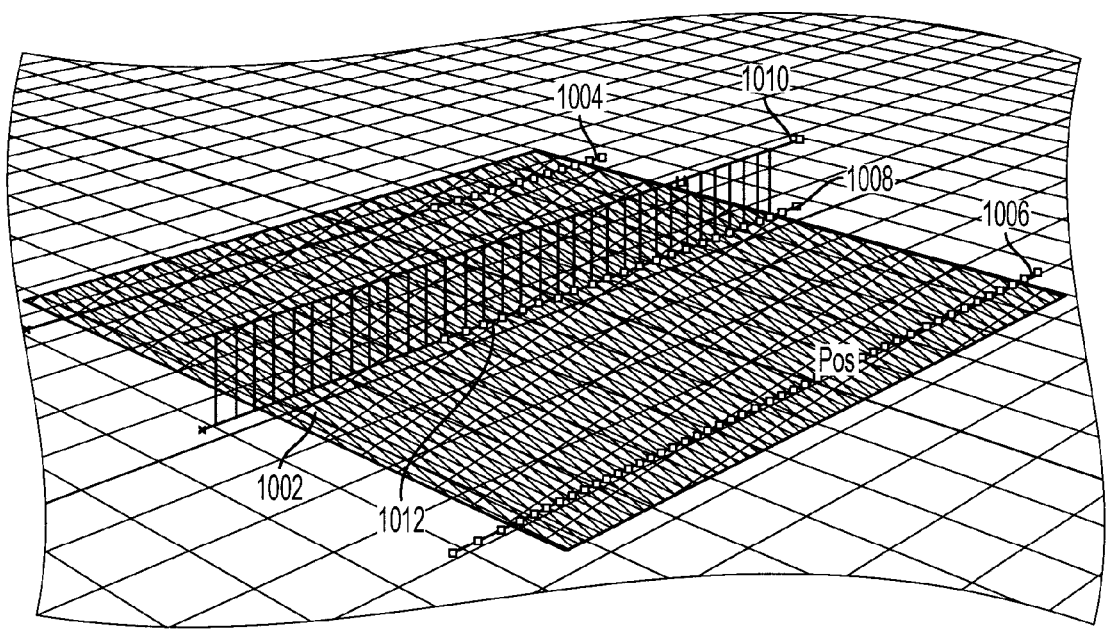
FIGS. 10-12 illustrate a simple deformation, an unwanted effect, and the deformation with culling.
Figure 11:
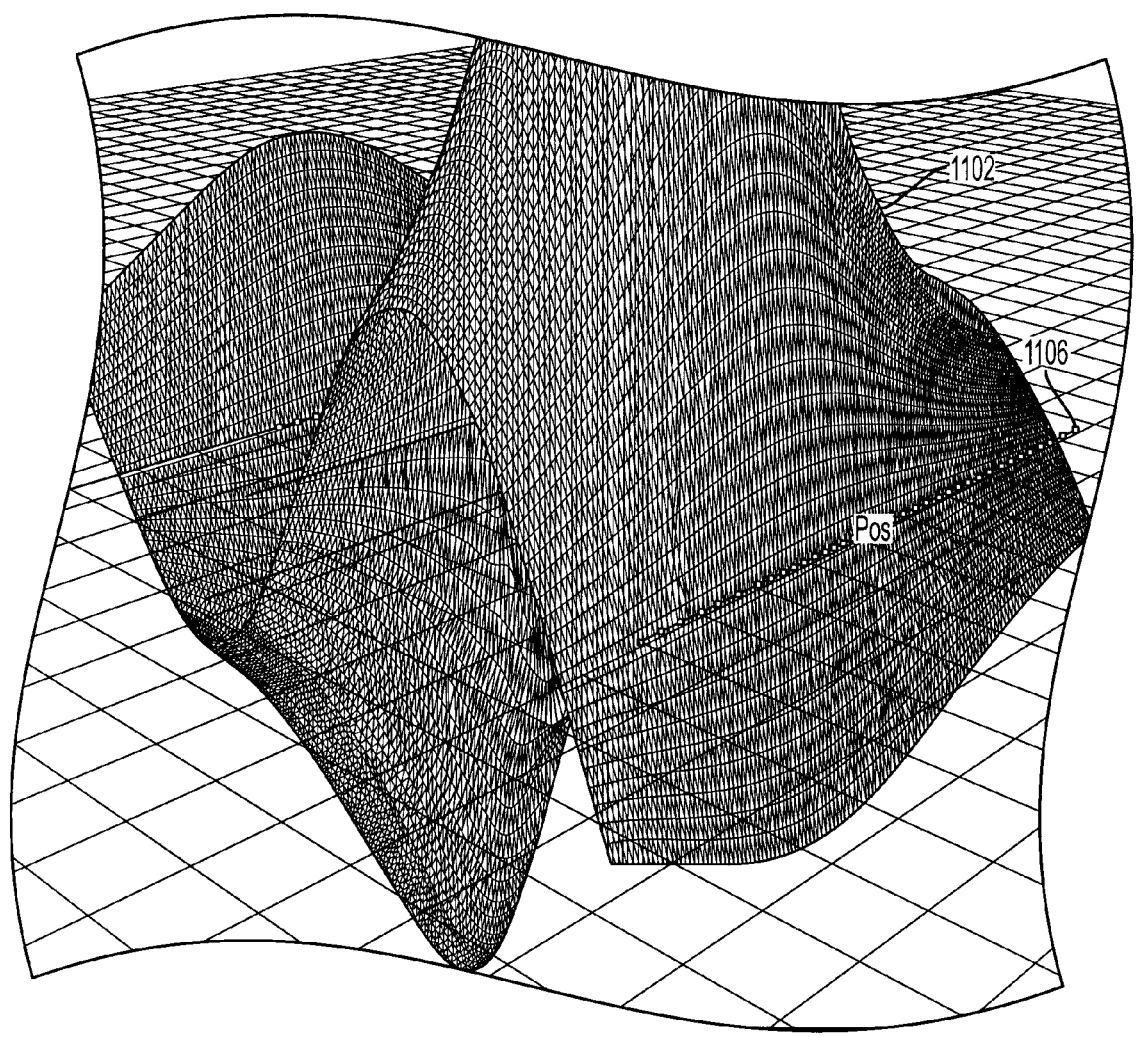

Another problem with the deformation of the entire model is that irregularities (non-smoothness) in the defining data can lead to wild interpolations. FIG. 10 illustrates a flat mesh 1002 to be deformed with positional constraints 1004 and 1006 on the left and right, and origin 1008 and destination 1010 modifier curves are in the middle. The arrow 1012 points to a point constraint that constrains the mesh to not move at that point. The point constraint was inadvertently selected by the user, and gives a directive that strongly clashes with the intended deformation. The irregular data can result from user error (such as inadvertently picking constraints, or specifying contradictory modifiers), noisy data, or other reasons. FIG. 11 depicts the wildly fluctuating mesh surface 1102 caused in the region of deformation to the left of the constraint 1106. The deformation is rather violent, and not what the user expected. The user needs a way of diagnosing which data points are leading to violent behavior in the interpolation and, optionally, automatically culling irregular data points.

A solution to this problem is to provide Laplacian point culling. (A Laplacian is generally defined as the difference between a quantity and an average of its neighboring quantities.) Given a discrete vector field (i.e. a finite set of points with attached vectors), we find a measure of the "smoothness" of this data. Should any data points deviate too much from their neighbors, these data points should be culled.

Let i=0, 1, 2 . . . , n−1 index the sample points. Let $d_i$ be the vector corresponding to sample i, and let $r_{ij}$ be the distance between samples i and j. Then the point set Laplacian for sample i is defined as:

$$\frac{\sum_{i \neq j} (d_i - d_j)/r_{ij}^2}{\sum_{i \neq j} \frac{1}{r_{ij}}}$$

This expression measures the deviation of a vector from a weighted average of all of the other vectors. The weighting gives nearer neighbors a greater weight than farther neighbors. The measure is scale independent, meaning that it does not change if the samples and vectors are uniformly scaled. If the size of the Laplacian is large, then there is a significant "bump" or discrepancy in the data that may lead to an unwieldy interpolation.

Figure 12:
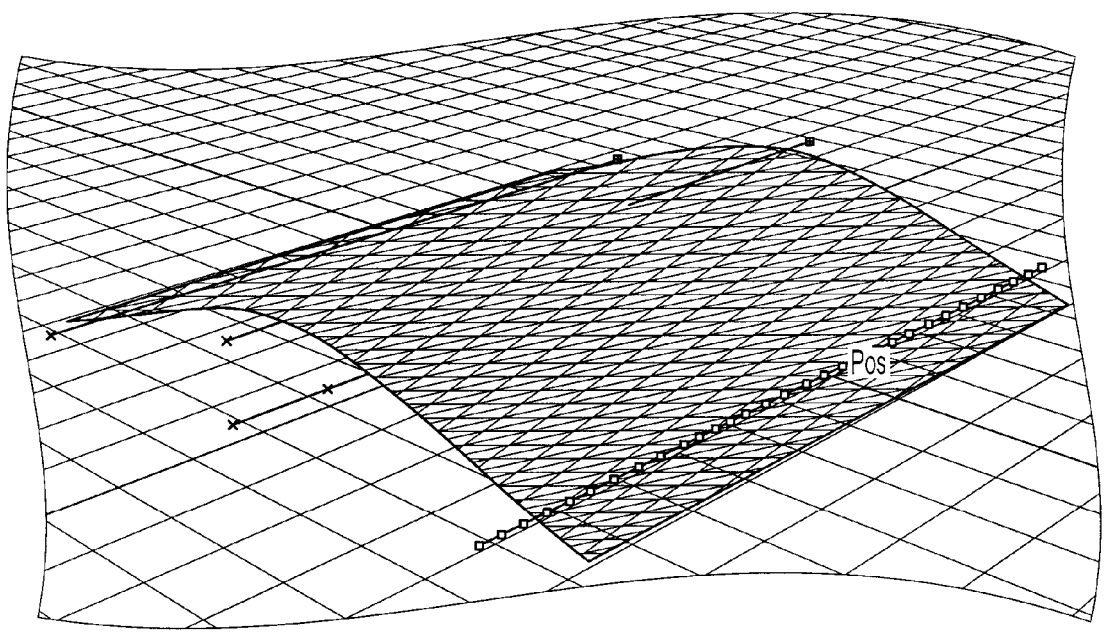

Computing the Laplacian for the deformation vector at every sample point solves the given problem. Sample points with Laplacians with a length over a given threshold (in our implementation we use 2.0) can either be highlighted, or automatically culled. In fact, points can be colored with a color range that indicates where they are on the continuum between "safe" and "problematic". FIG. 12 illustrates the deformation defined in FIG. 10, after the offending sample has been automatically culled.

Additional details of the Laplacian culling will be described later herein.

Figure 13:
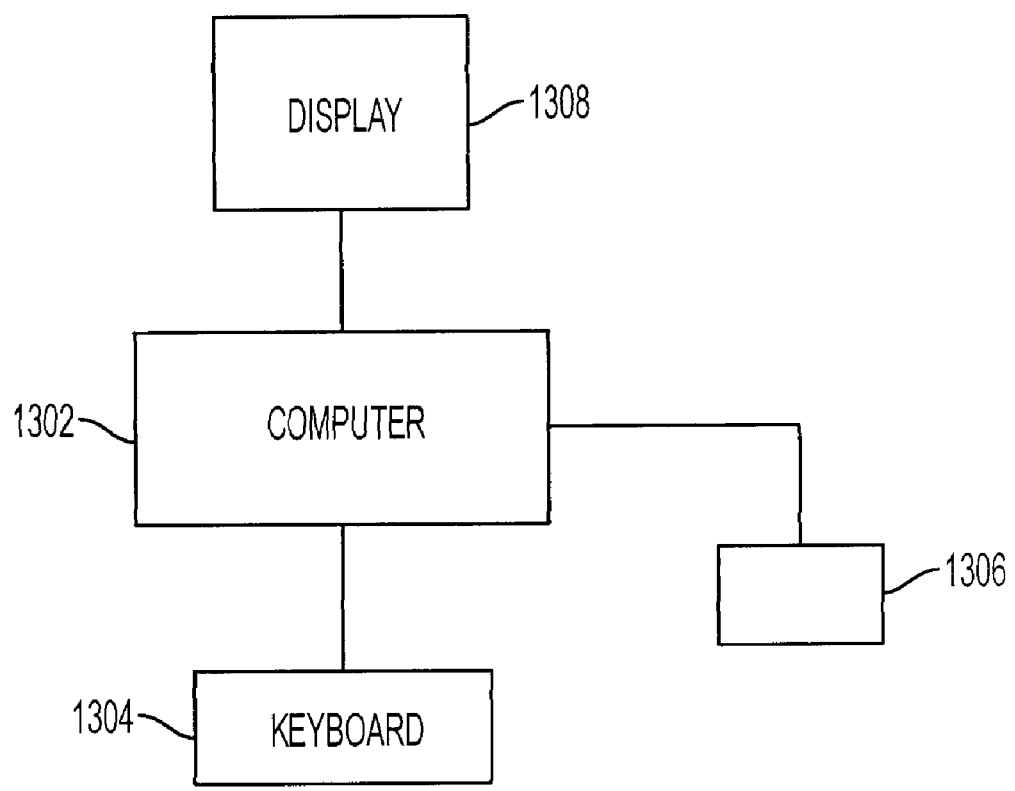
FIG. 13 illustrates a hardware configuration.

The embodiments discussed herein operate within and as part of a conventional computer system as shown in FIG. 13 executing a modeling package such as AliasStudio® available from Autodesk. Such a system includes a computer 1302 that executes the processes discussed herein at the direction of a user using a keyboard 1304 and mouse 1306 and displays the results on a display 1308.

In performing a deformation using a modifier, the user often recognizes that anomalies such as those discussed above occur. In such a situation the user can select a solution to the anomaly from among the set of solutions discussed above. This solution is then applied during the deformation process to fix the anomaly. The set of solutions is discussed in more detail below.

Region Clamp Embodiment

Figure 14:
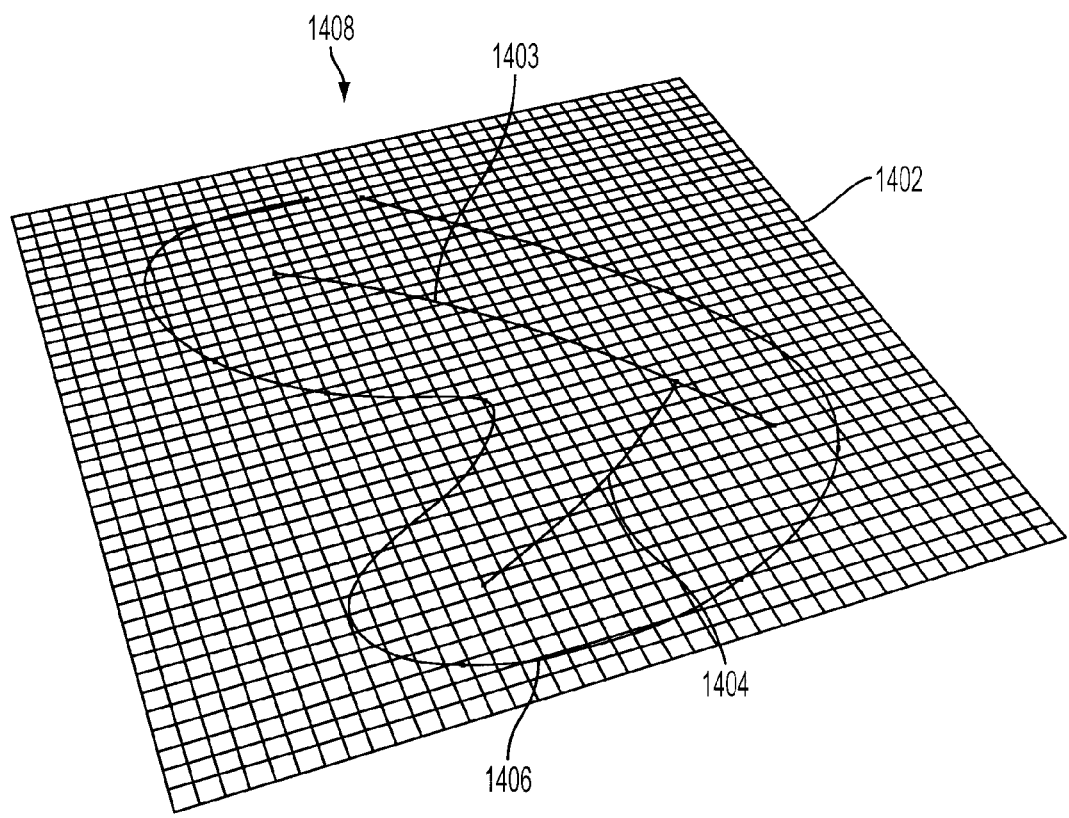
FIGS. 14-20 show additional clamping examples.
Figure 15:
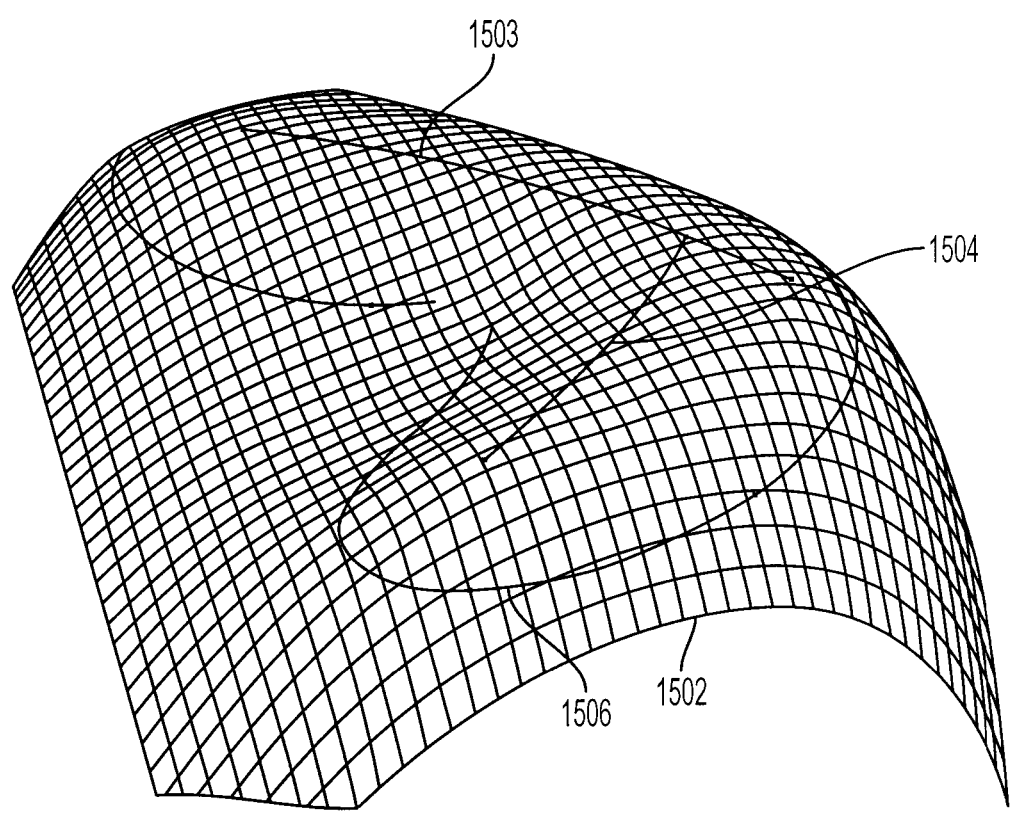
Figure 16:
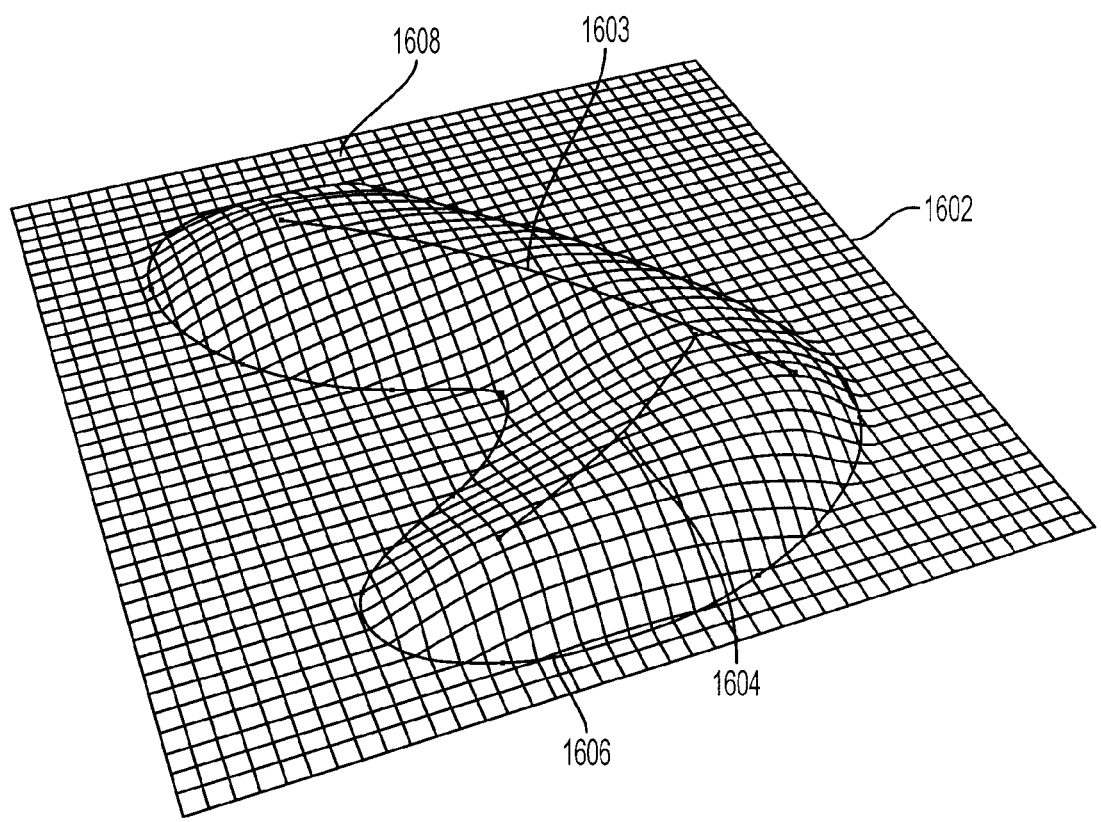

FIG. 14 starts another example of the clamping function and shows a mesh surface 1402 with modifier curves 1403 and 1404 and a positional constraint curve 1406. As can be seen, the constraint curve 1406 is not a closed curve and has a break 1408. As depicted in FIG. 15, when the modifier curves 1503 and 1504 are lifted to their deforming position, the entire surface 1502, inside (respectively outside) the positional constraint curve 1506 is pulled up (respectively down). When clamping is activated, as depicted in FIG. 16, the surface 1602 outside the constraint is clamped to the original level even though the level of the surface at the modifier is pulled up. Because the clamping region is calculated via interpolation, the break 1608 is effectively closed.

Figure 17:
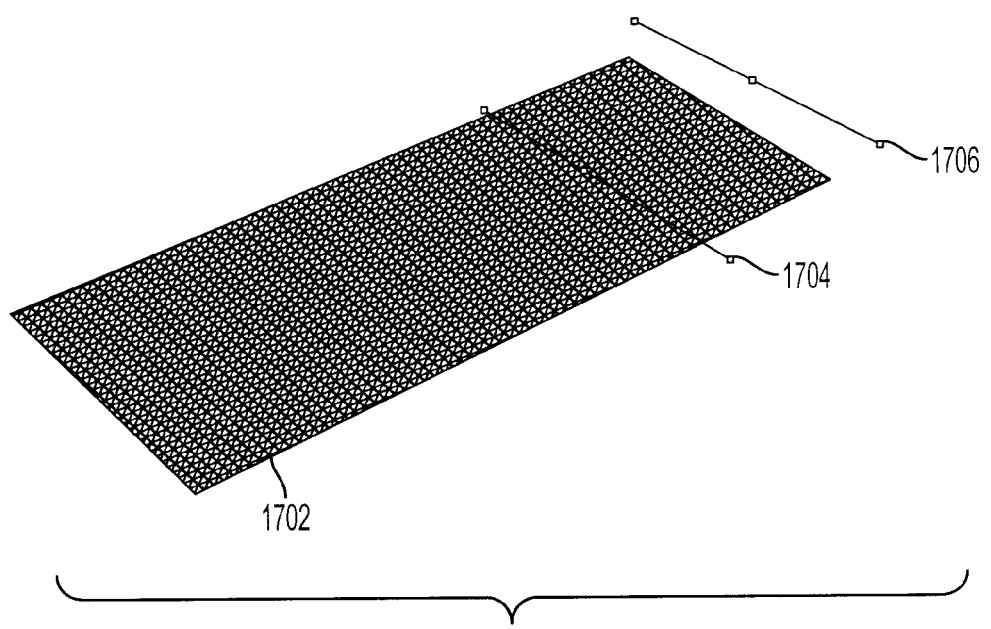
Figure 18:
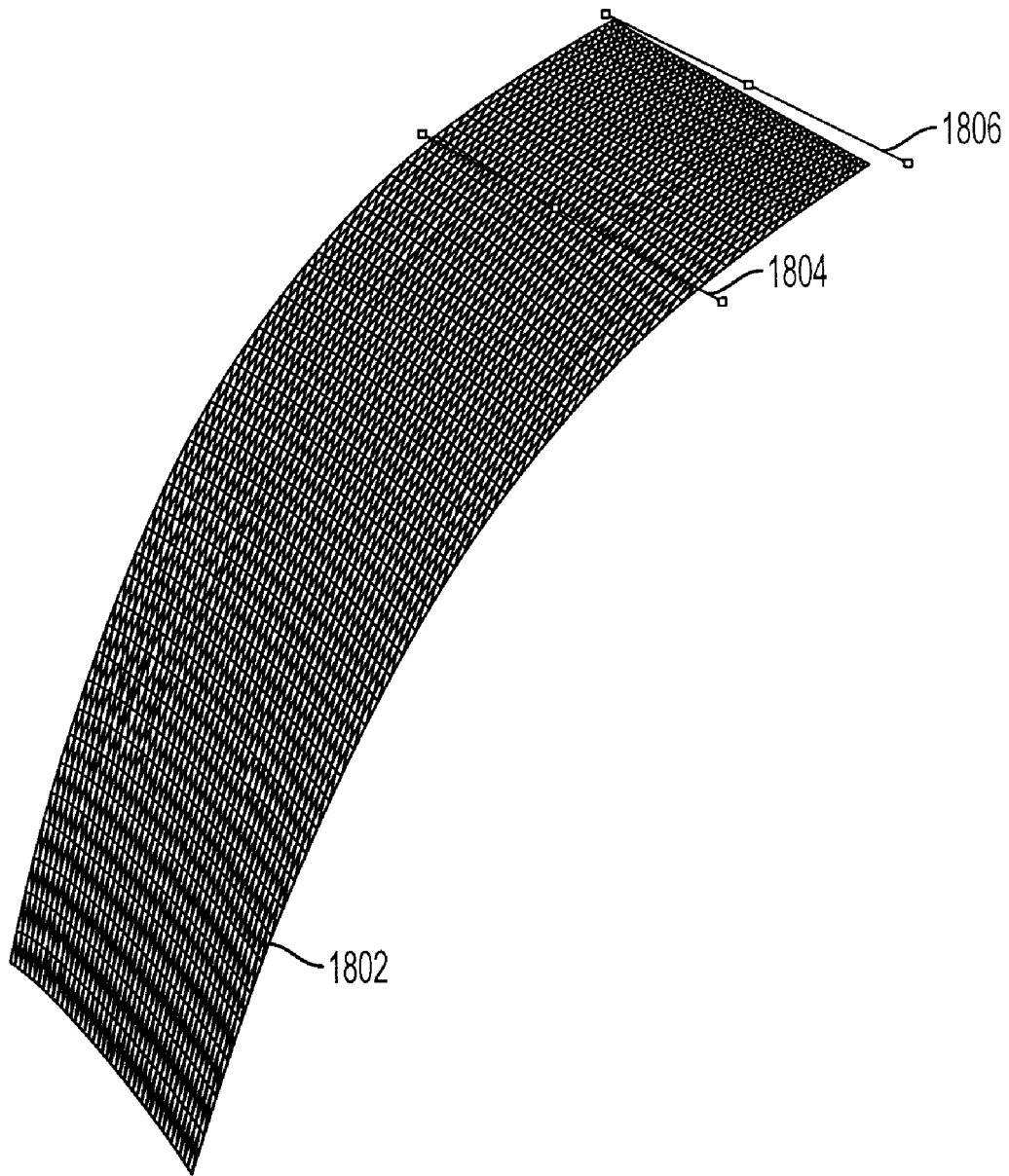
Figure 19:
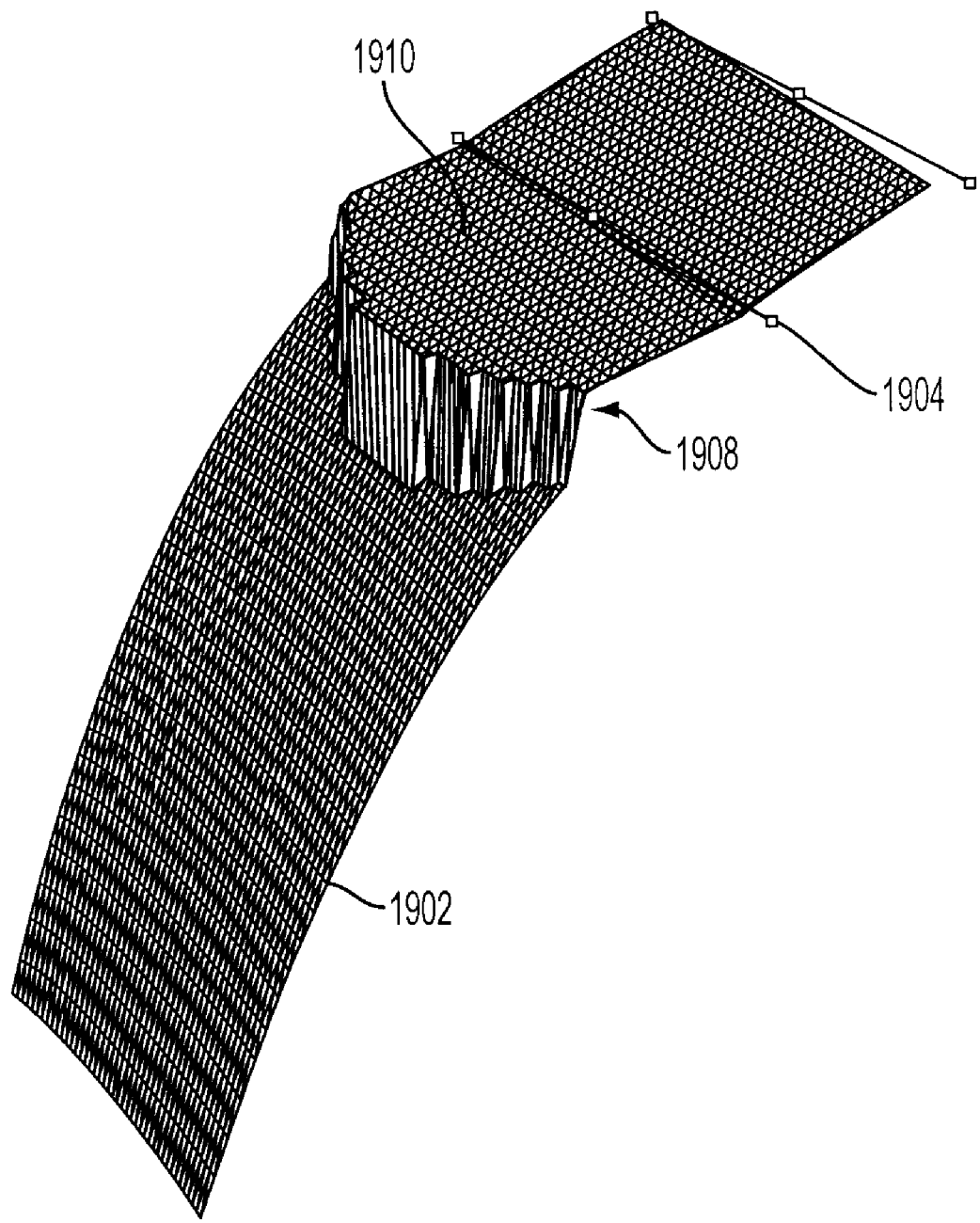
Figure 20:
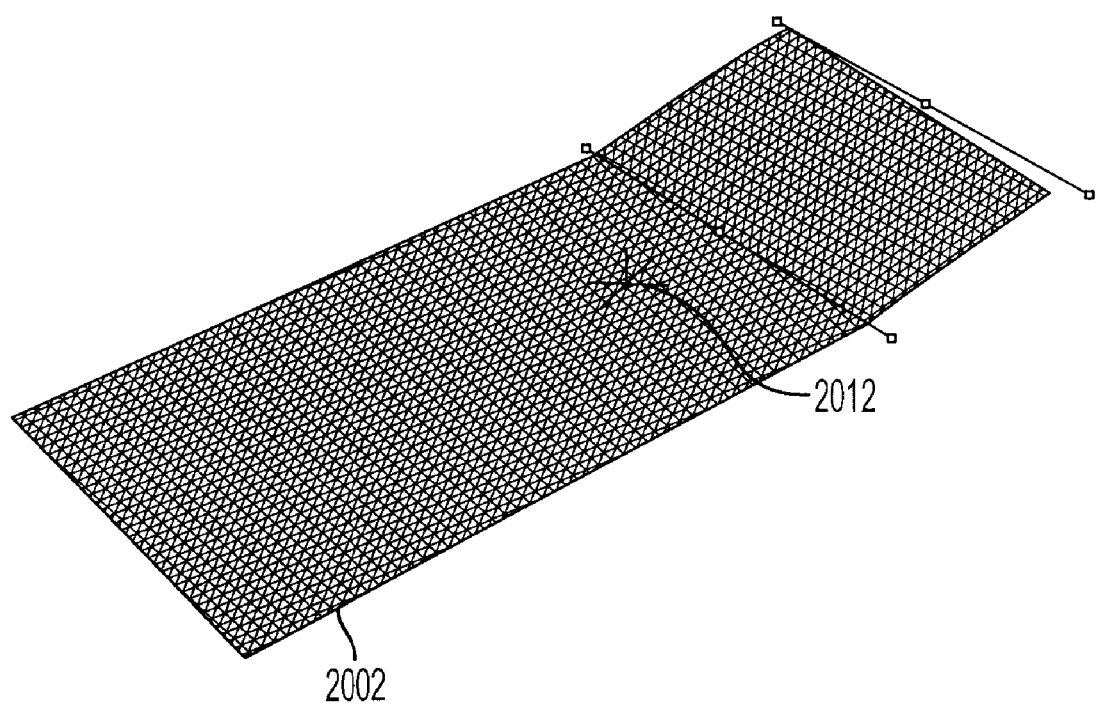

Sometimes the region determined by automatic clamping does not extend to all areas that the user would like to be unaffected by the deformation. This limit on the clamping region can result in anomalous behavior that can also be solved with a clamper point. FIG. 17 depicts a simple surface 1702 and an associated constraint 1704 and a modifier 1706. When the modifier 1806 is allowed to modify the surface 1802 without clamping, the surface 1802 is deformed as in FIG. 18. When the clamping is turned on, because the clamping region of effect of the curve 1904 is limited (see FIG. 19), the surface 1902 shows the range or limit 1908 of the clamping region 1910. When this occurs, as depicted in FIG. 20, a clamper point 2012 can be inserted in the middle of the clamp region. This additional clamping information is enough to extend the computed clamp region to include the entire left end of the mesh 2002. The user can insert this clamper 2012 when the user recognizes the anomaly. As an alternative, this determination of the location of the insertion point could be automatic, as described later herein.

Figure 21:
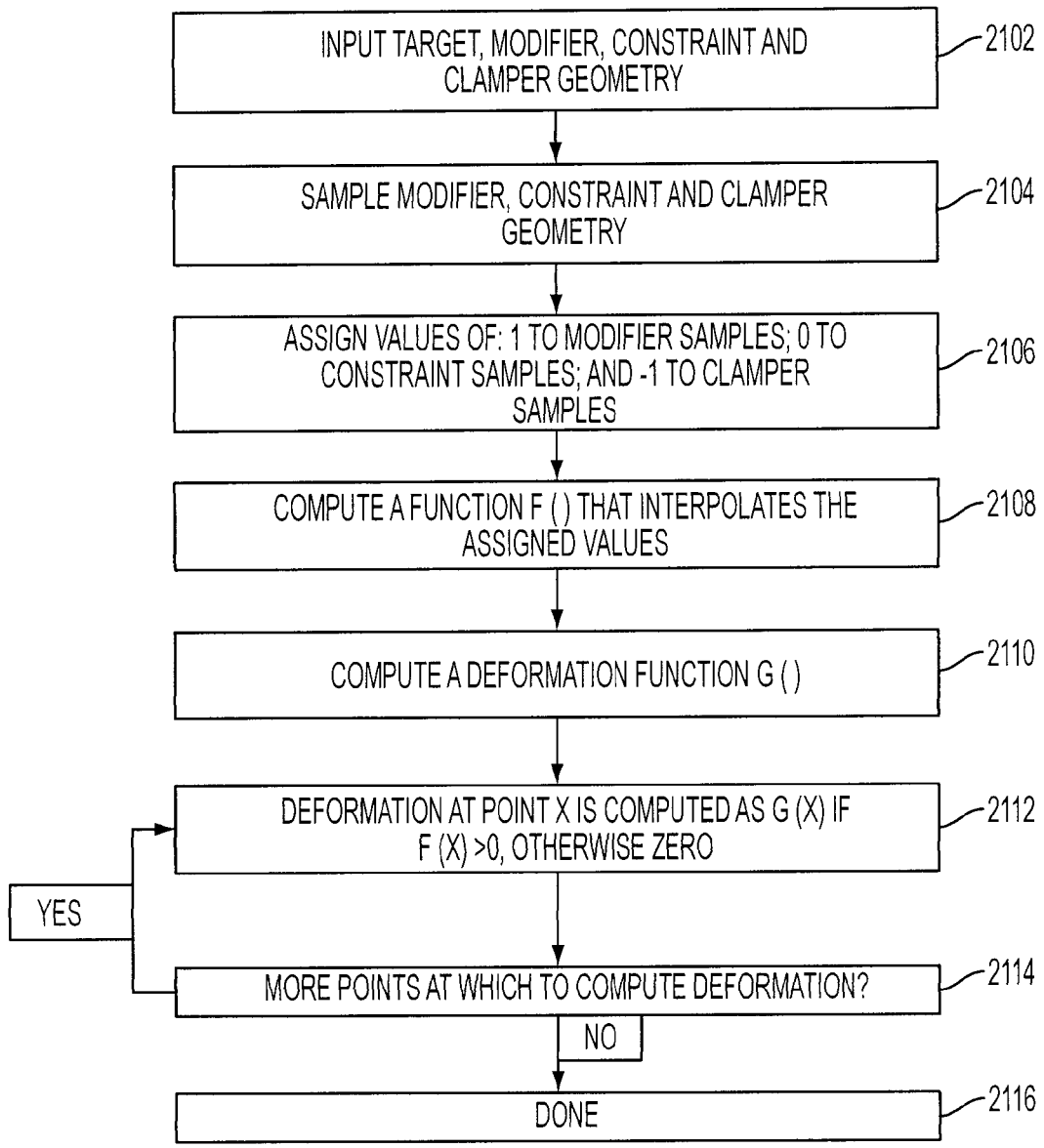
FIG. 21 depicts a clamping process.

The clamping operation, as depicted in FIG. 21 starts with inputting 2102 the target surface, the modifier, the constraint and the clamper geometry. The system then samples 2104 the modifier, constraint and the clamper geometry. Next, the system assigns 2106 modifier samples a value of 1, constraint samples a value of 0 and clamper samples a value of −1. The system next interpolates 2108 between the assigned values. The deformation function is then computed 2110 followed by the determination 2112 of the deformation at a specific point. If more points need to be computed 2114, the system loops back. If not, the system is finished 2116.

Figure 22:
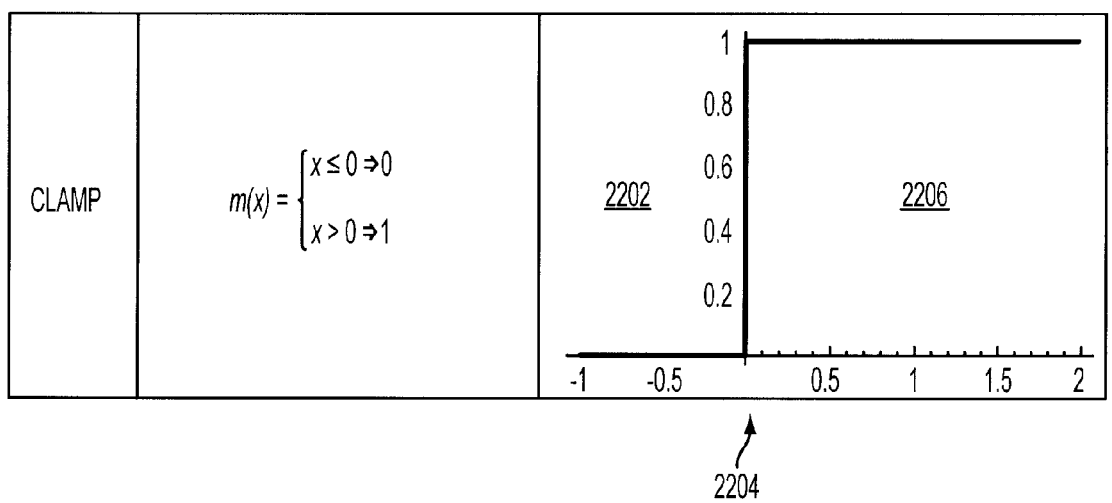
FIG. 22 depicts a clamp function.

The transfer function, m(t), for the clamping limited deformation is depicted in FIG. 22 and zero on one side 2202 of the constraint 2204 and one on the other side 2206.

In the above-discussed process, for a point x, we calculate the raw deformation vector g(x) and the scalar f(x). The value of the final deformation vector is m(f(x))g(x).

As discussed above, both f( ) and g( ) are calculated by interpolation of values set at sample points. In the following table, the sample point types are across, and the modification types, including those to be discussed later, are down. The values given in the table are the values that are interpolated by f( ).

|  | Modifier | Tangent Constraint | Positional Constraint | Clamper |
|---|---|---|---|---|
| Clamp | 1 | 0 | 0 | −1 |
| Tangent Continuous and Order-n Continuous | 1 | 0 | 1 | n/a |

In the foregoing, we use the sign of the clamping function to determine whether a point is to be clamped or not. That is, the clamping function determines the clamping region. It is a common in algorithms to define regions in this way, i.e. as implicit surfaces and regions. Not only is membership in a region determined by a simple function evaluation, but also this function evaluation may be much faster than an algorithm that works through geometric calculations. On the other hand, the clamping region determined as in FIG. 21 may not meet user expectations as well as a region determined by other means such as sophisticated geometric calculations or user inspection. But we can encode such an improved region by supplementing the points to be interpolated by the clamping function so that the new clamping region matches the improved region to within reasonable tolerance. An example of this is the use of clamper points supplied by the user. (For a reference that explains how to encode a region using implicit functions, see "Modeling with Implicit Surfaces that Interpolate", Greg Turk and James F. O'Brien, ACM Transactions on Graphics, Vol. 21, No 4, October 2002 at http://www.cc.gatech.edu/~turk/my_papers/vimp_tog.pdf)

Rigid Deformation Embodiment

Figure 23:
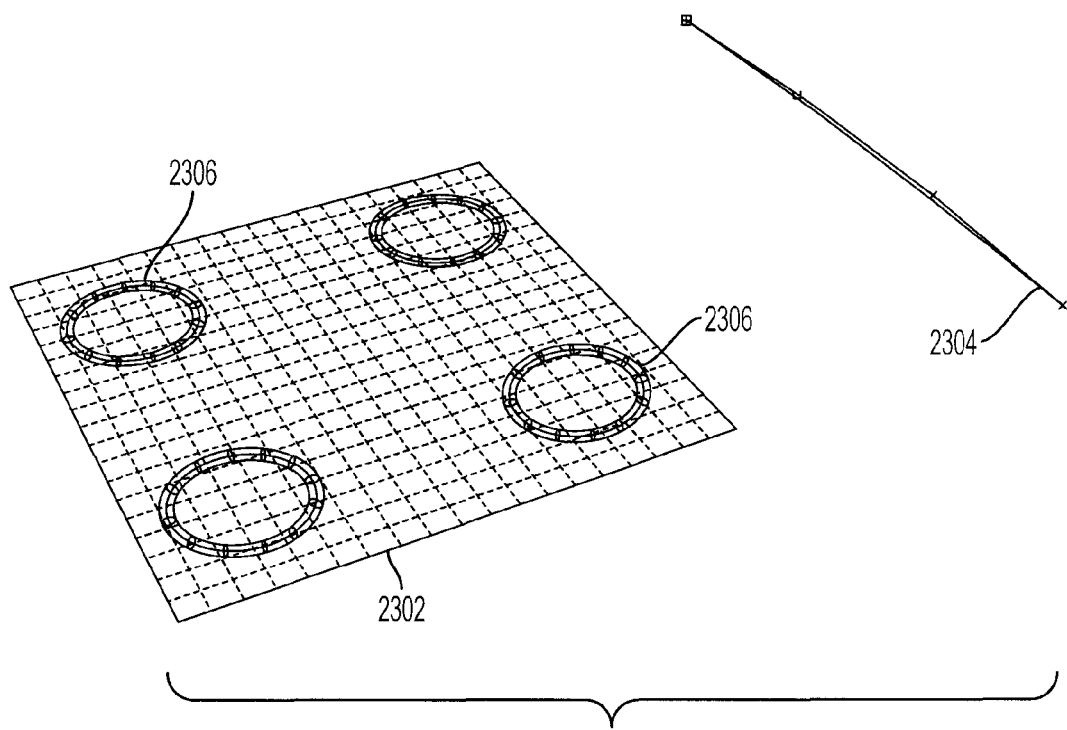
FIGS. 23-25 shows an additional rigid object example.
Figure 24:
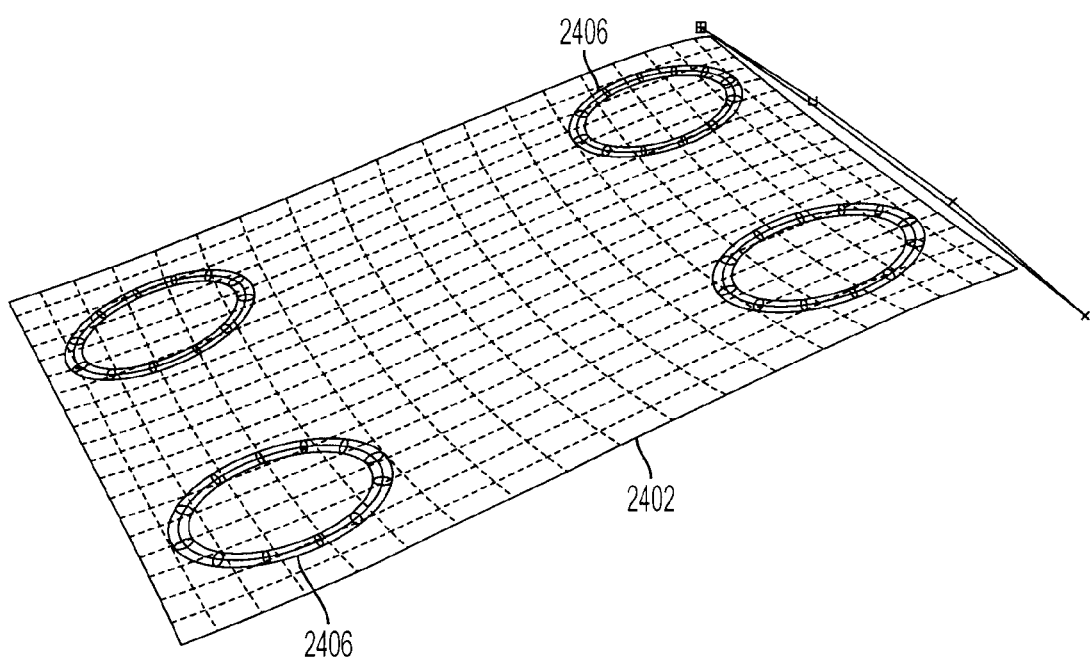
Figure 25:
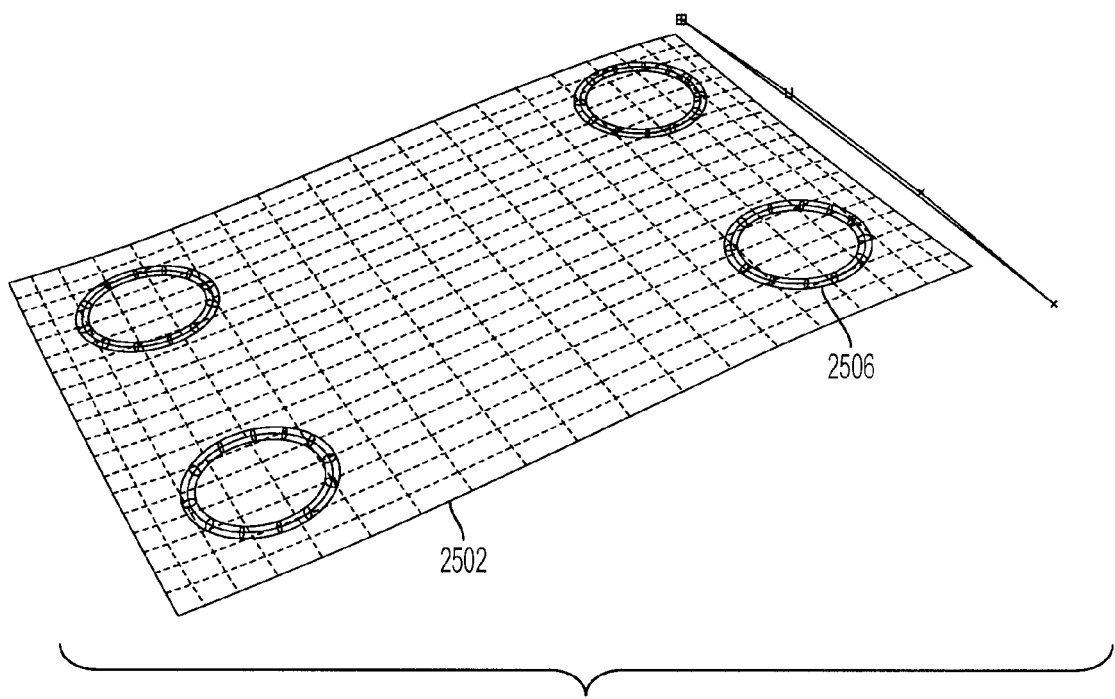
Figure 26:
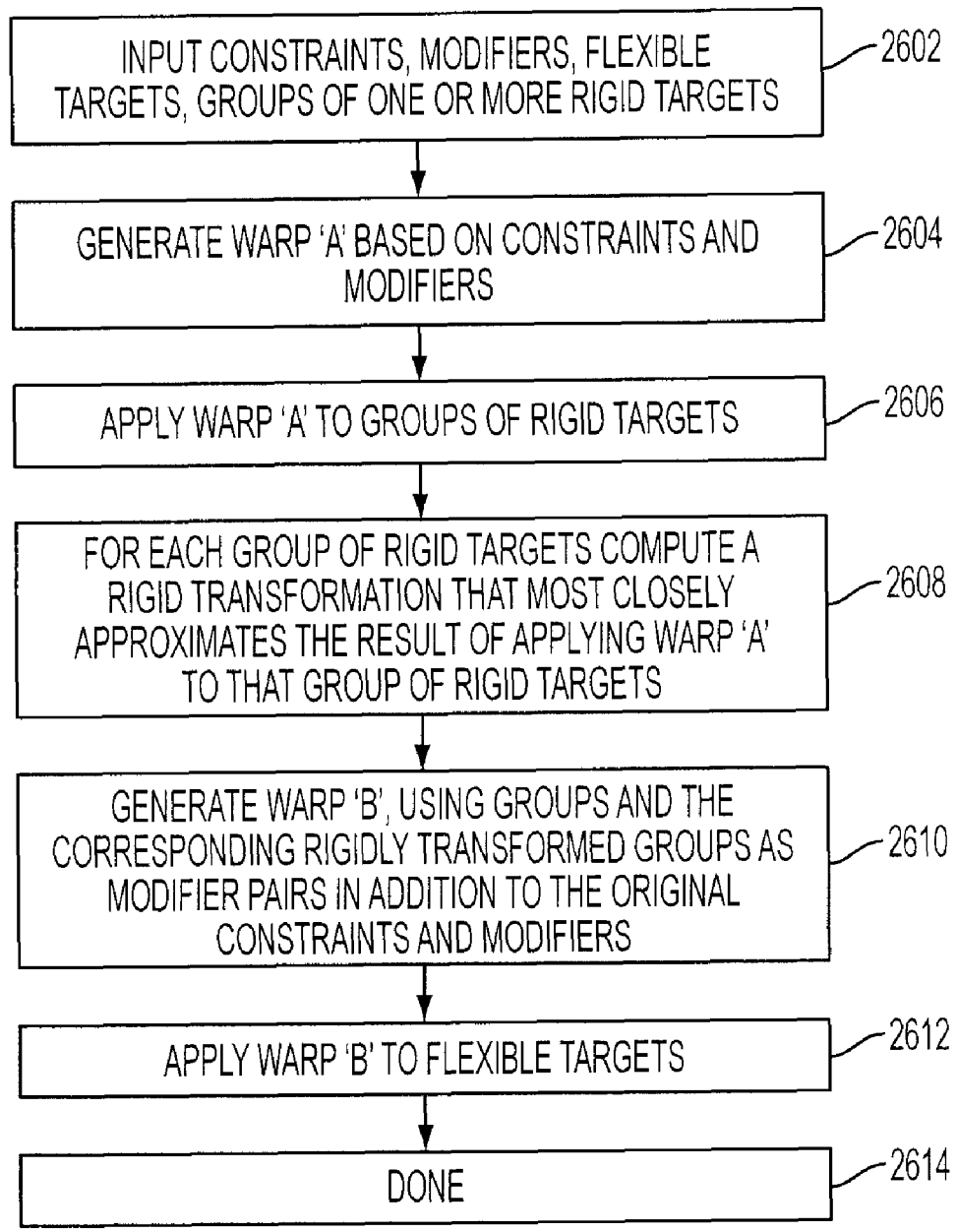
FIG. 26 depicts a rigid object process.

To illustrate the operations associated with deformations of models that include rigid objects, we start by depicting, in FIG. 23, a surface 2302 to be deformed by a modifier 2304 that will move the surface toward the modifier and where the surface 2302 includes rigid rings or grommets 2306. When the deformation is performed, the grommets 2406 are stretched along with the surface 2402 as depicted in FIG. 24. When the rigid deformation of this embodiment that accounts for the movement of the rigid objects is performed, the grommets 2506 are moved relative to the deformation of the surface 2502 to keep their shape as shown in FIG. 25.

The rigid deformation operations start with inputting 2602 the constraints, modifiers, flexible targets and rigid targets. Based on the modifiers, constraints, and targets, the system generates 2604 a warp A of the flexible surface. This warp A is generated and applied 2606 to the rigid targets. Once this warp is applied, the motion of the rigid targets is extracted 2608. The motion of the rigid objects is used to generate 2610 a warp B using the motion of the rigid objects as additional modifiers. The warp B is then applied 2612 to the flexible targets and results in deformation of the surface without the deformation of the rigid objects.

Tangent Continuity and Order-n Continuity Embodiment

Figure 27A:
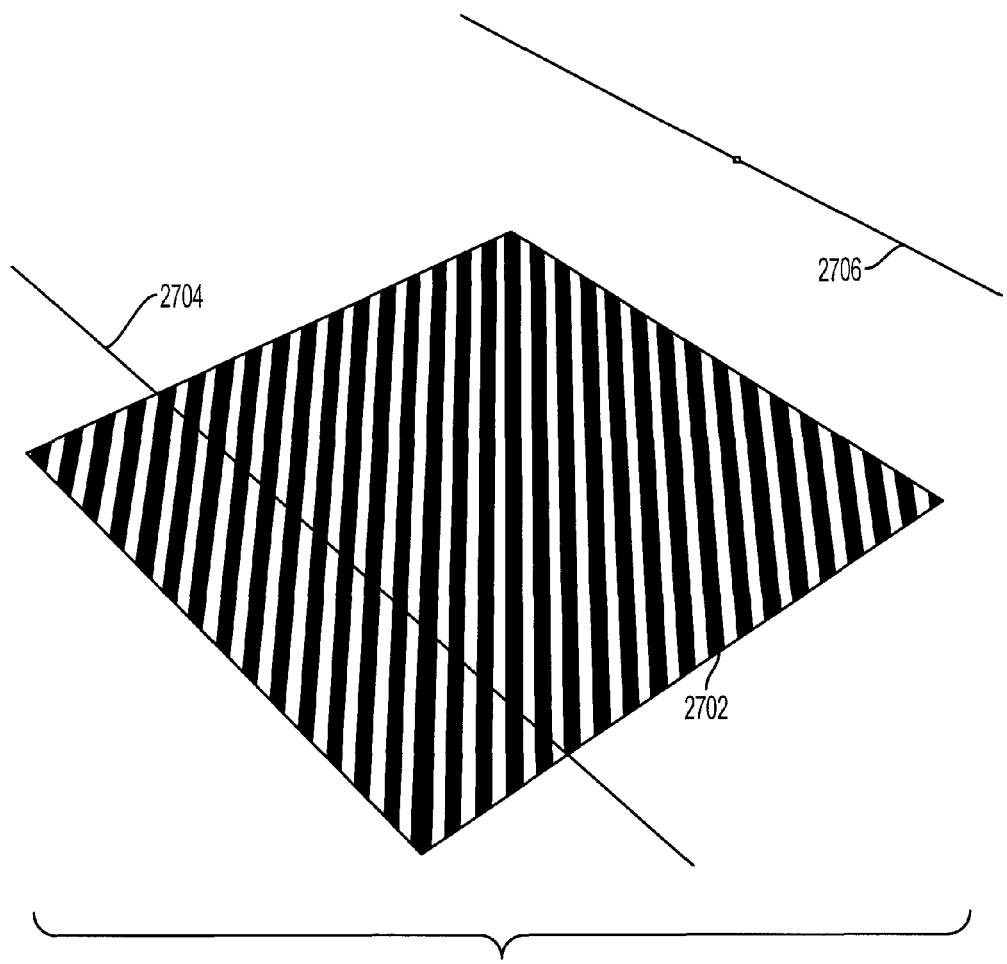
FIGS. 27-31 show additional continuity examples.
Figure 27B:
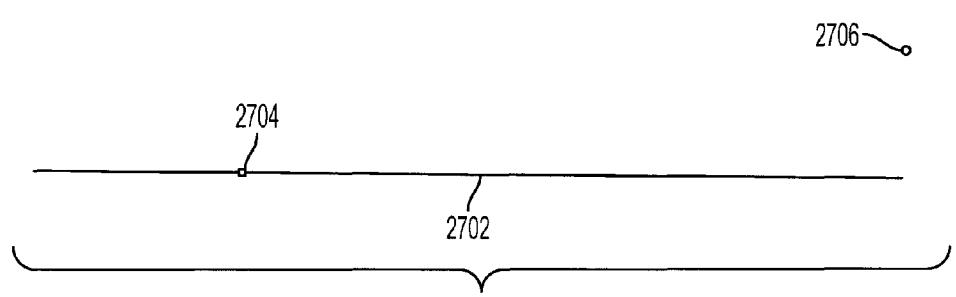
Figure 28A:
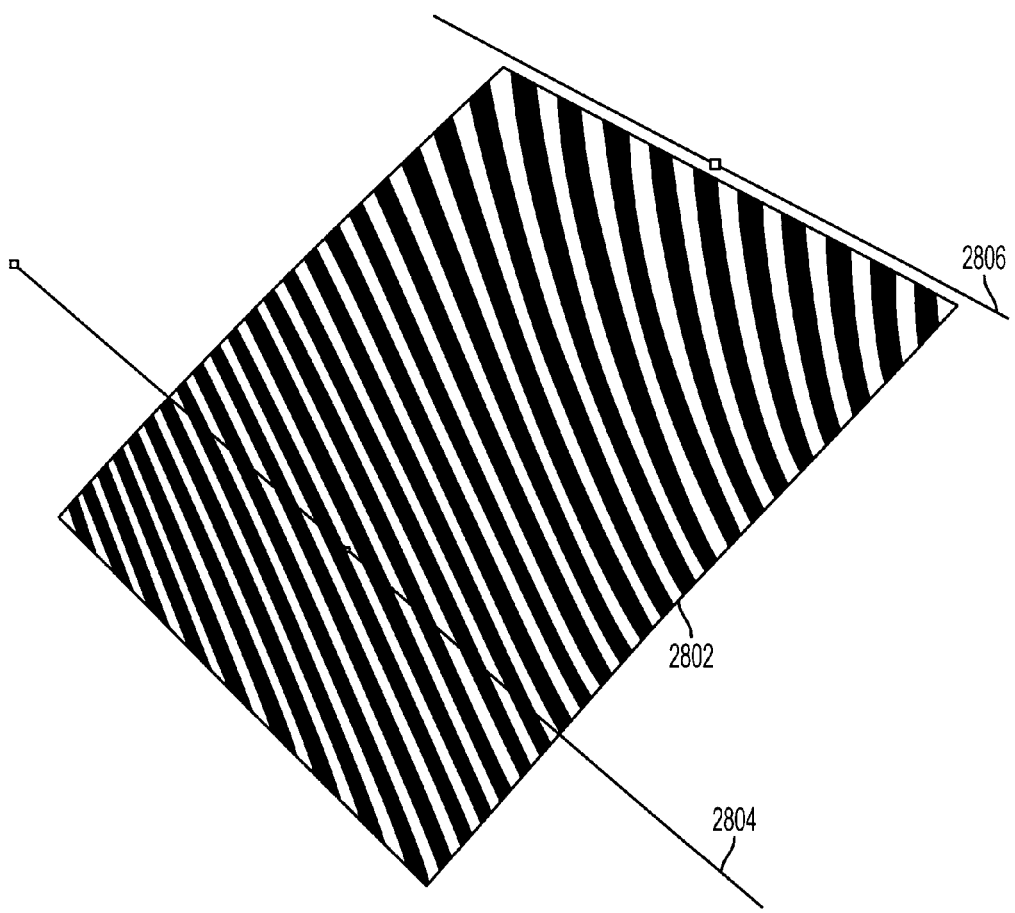
Figure 28B:
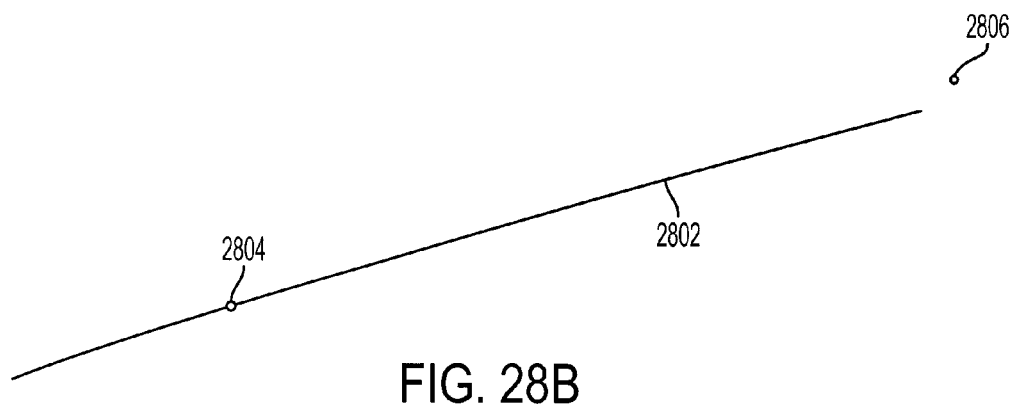
Figure 29A:
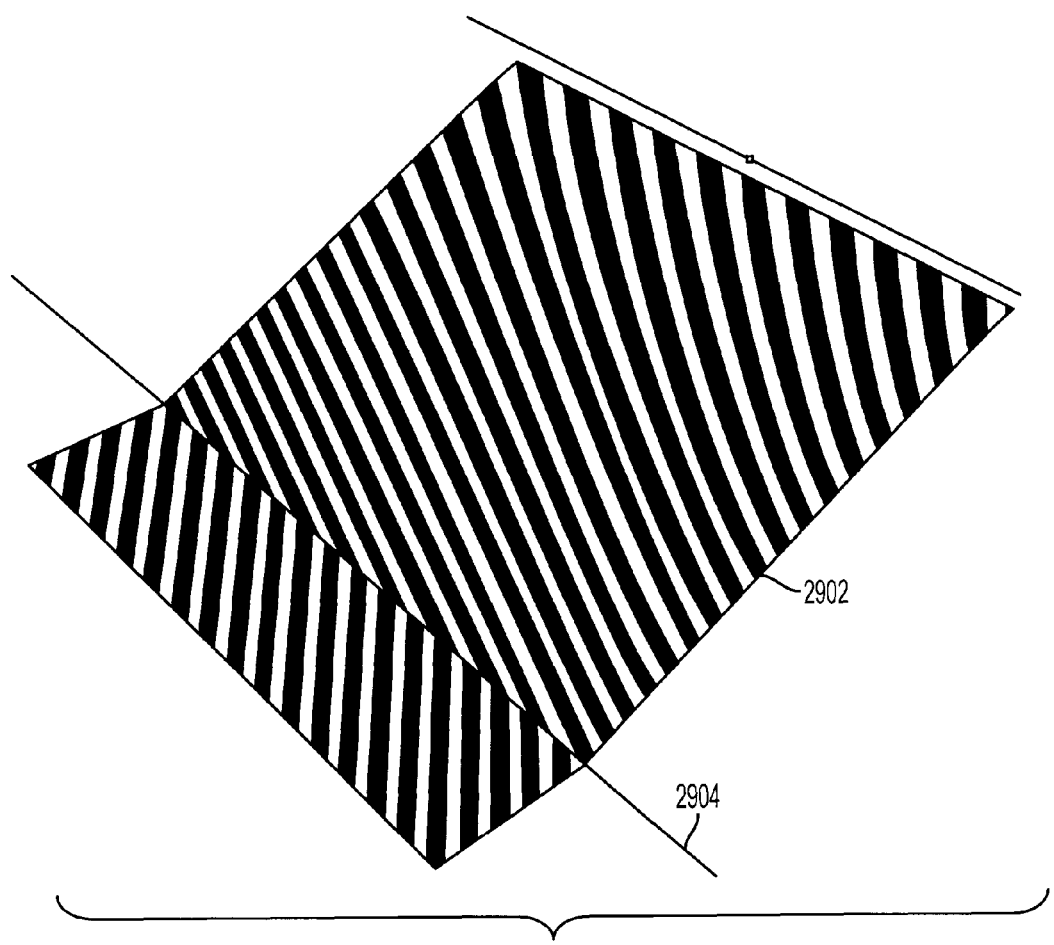
Figure 29B:
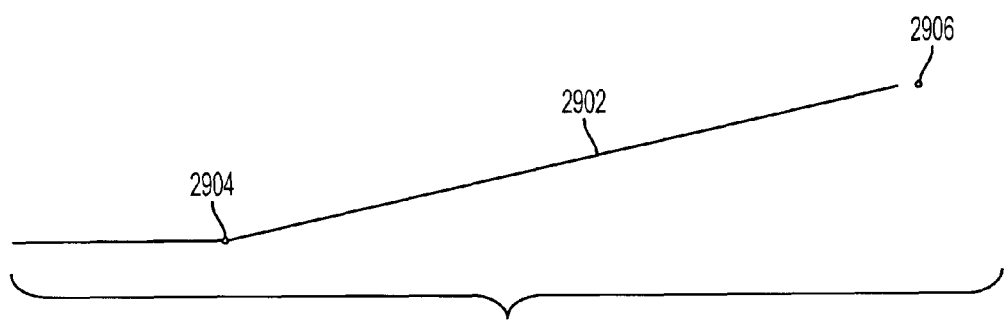
Figure 30A:
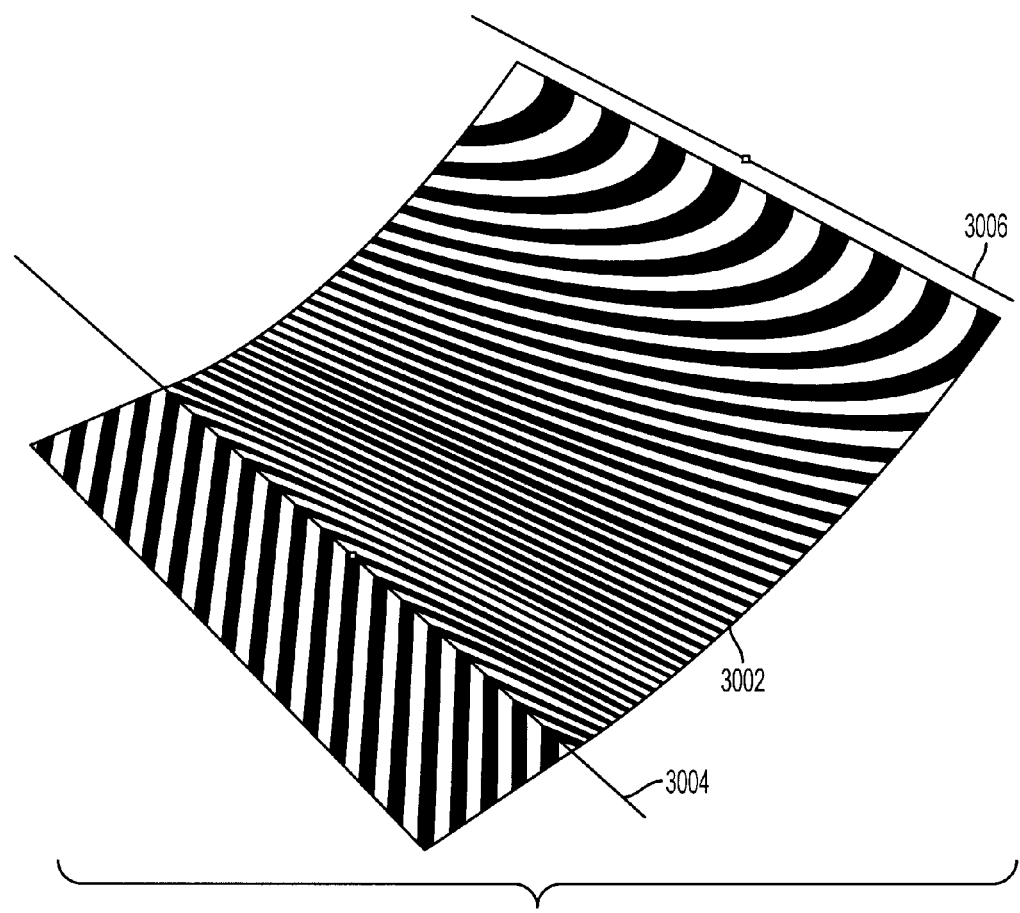
Figure 30B:
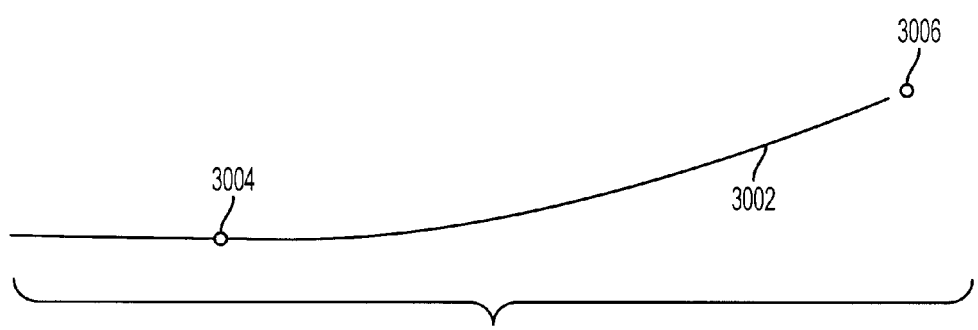
Figure 31A:
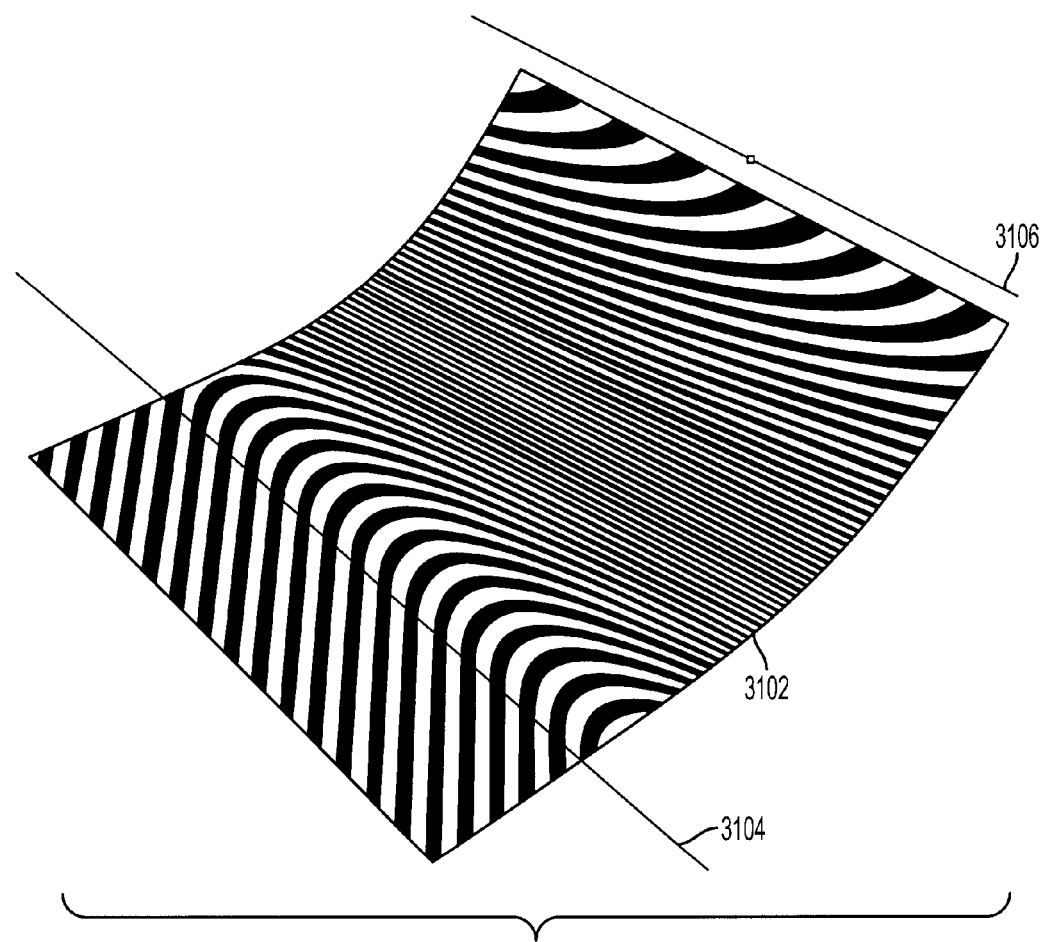
Figure 31B:
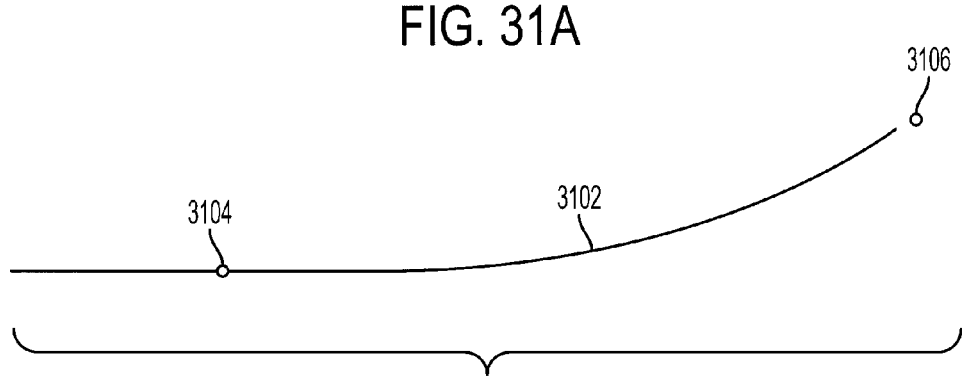

To help visualize the problem of not maintaining tangent continuity and effect of doing so, the discussion below will use a diagnostic stripe pattern reflected from the surface being deformed. In industrial and automotive design applications, reflections are often used to evaluate higher order continuity properties of surfaces. For example, a positional reflection discontinuity corresponds to a tangential surface discontinuity, and a tangential reflection discontinuity corresponds to a discontinuity in surface curvature. FIG. 27A depicts a perspective view of a surface 2702 reflecting a zebra stripe pattern. This surface 2702 has associated with it a constraint curve 2704 and a modifier 2706. FIG. 27B provides a side view. When the surface 2802 (see FIGS. 28A & B) is deformed toward the modifier 2806 without clamping at the constraint curve 2804, the reflection has maintained its regular appearance with no discontinuities in the reflected stripes. When automatic clamping is turned on, as depicted in FIGS. 29A & B, the surface on one side of the constraint maintains its position while the surface on the other side is deformed. As can be seen, the stripe pattern reflected on the surface 2902 shows reflection discontinuities at the constraint curve 2904. When a tangent continuity function that applies a tangent constraint to the surface 3002 is applied in association with the constraint curve 3004, the reflection discontinuities are removed as depicted in FIGS. 30A and 30B. However, the reflection still has artifacts that may be unwanted, such as the noticeable change of direction of the stripes that makes the transition particularly visible. When order-n continuity (for n=2) is also applied, as depicted in FIGS. 31A & B, to provide a second order tangent continuity, the stripes have no discontinuities and do not change direction at the constraint. This sort of smooth transition is desirable in, for example, the automotive industry. Note that, when n=1, order-n continuity is the same as tangent continuity.

Figure 32:
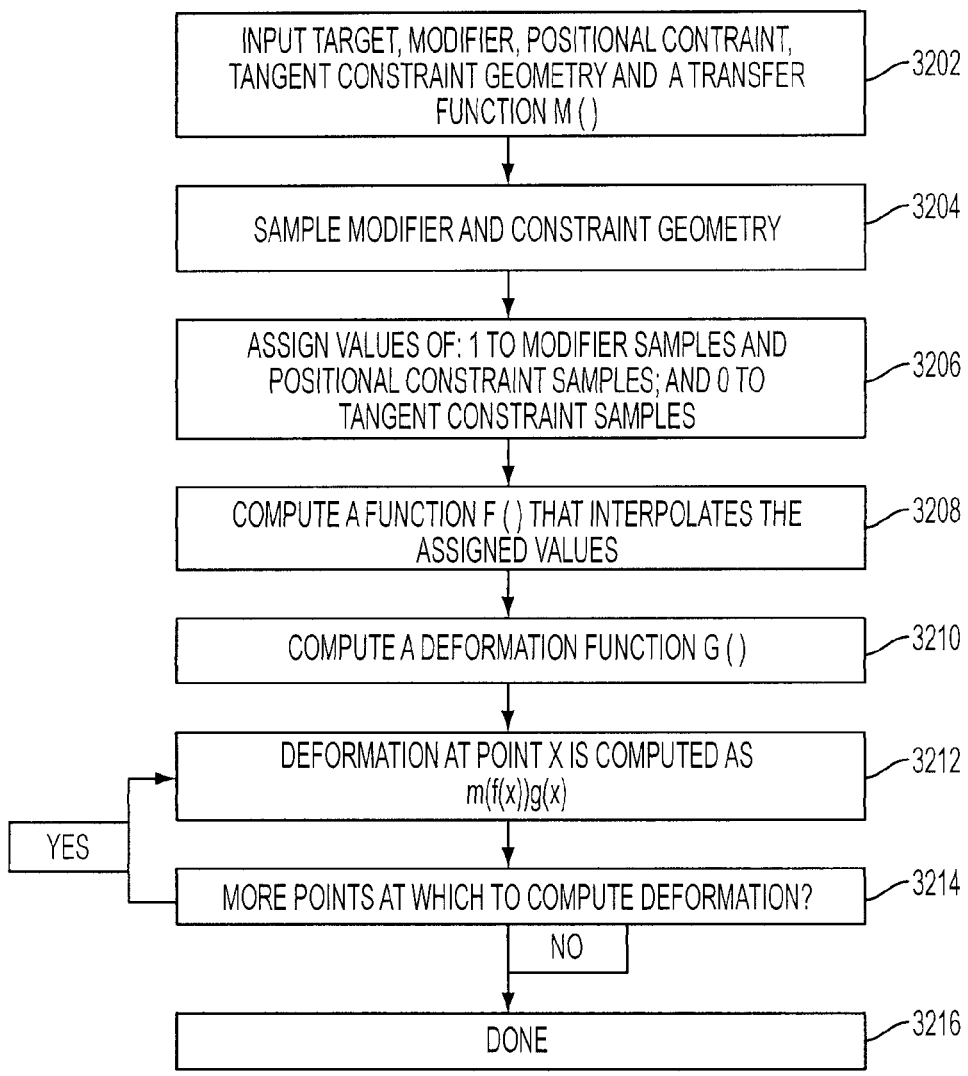
FIG. 32 shows a continuity process.

The process performed for this embodiment, starts with inputting 3202 (FIG. 32) the target surface, the modifier, the positional constraint and the tangent constraint geometry. The system then samples 3204 the modifier, positional constraint and the tangent constraint geometry. Next, the system assigns 3206 modifier and positional constraint samples a value of 1, and tangent constraint samples a value of 0. The system next interpolates 3208 between the assigned values. The deformation function is then computed 3210, followed by the determination 3212 of the deformation at a specific point. If more points need to be computed 3214, the system loops back. If not, the system is finished 3216.

Figure 33:
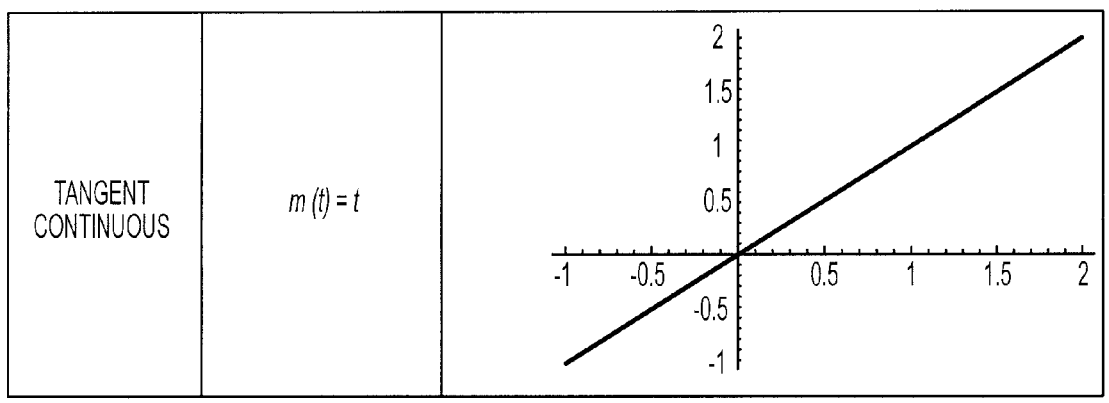
FIGS. 33 and 34 show continuity functions.

The transfer function, m(t), for the tangent continuous limited deformation is depicted in FIG. 33 and is zero at the constraint (t=0), less than zero on one side of the constraint (t<0) and greater than zero on the other side (t>0).

Figure 34:
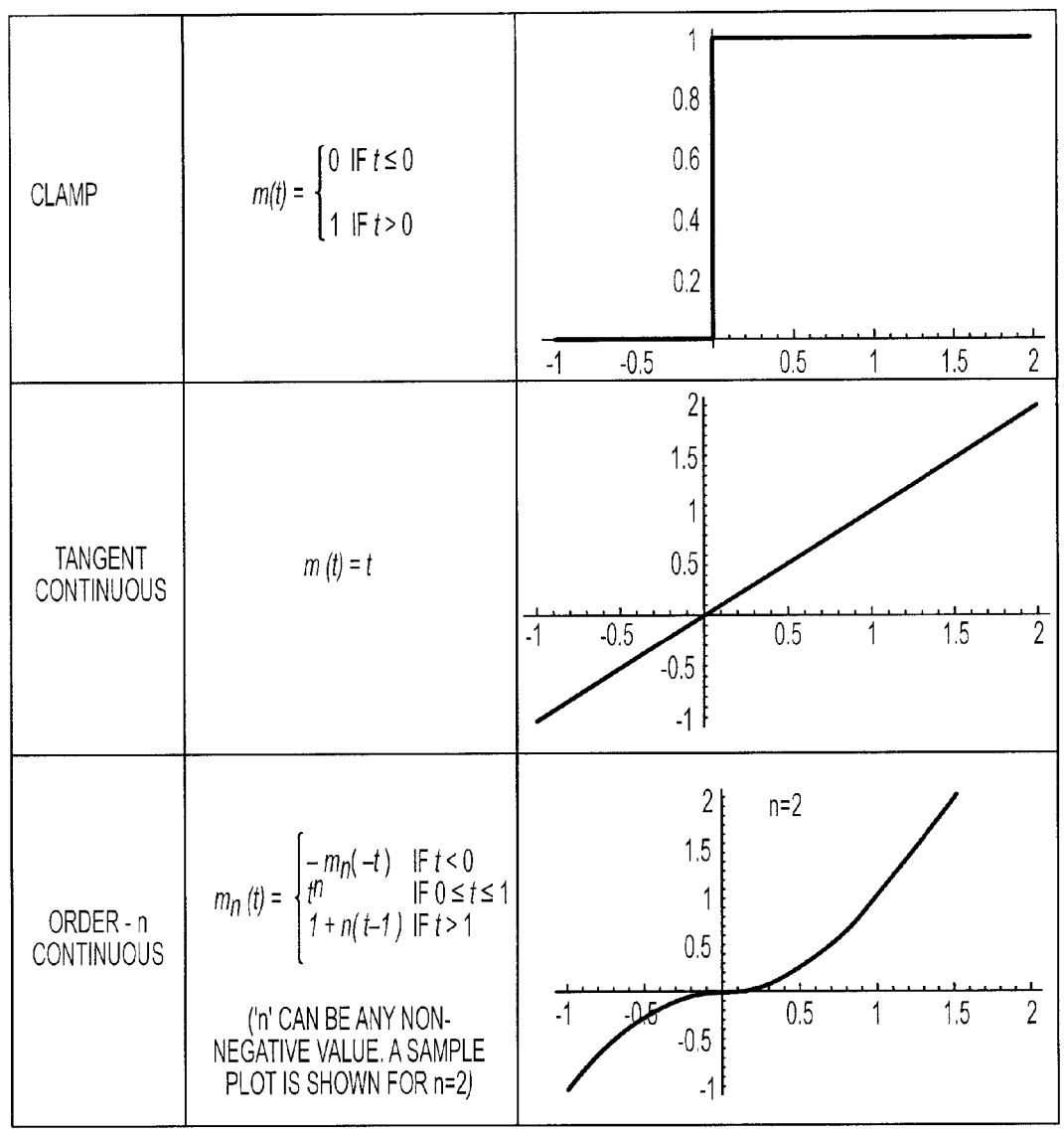

The transfer function, $m_n(t)$, for the order-n continuous limited deformation is depicted in FIG. 34 and is less than zero and accelerating downward on one side of the constraint and greater than zero and accelerating upward on the other side, while the first n−1 derivatives vanish at the constraint. Note that, when n=1, the function $m_n(t)$ is the same as m(t).

When clamping is applied, the values of the tangent continuous and order-n continuous transfer functions m(t) and $m_n(t)$ for values of t<0 are irrelevant, because clamping is applied for those values. Alternatively if the values of m(t) and $m_n(t)$ are defined as zero for t<0, then clamping and tangent/order-n continuity can be applied in a single step, even though they are conceptually different.

Laplacian Culling Embodiment

Figure 35:
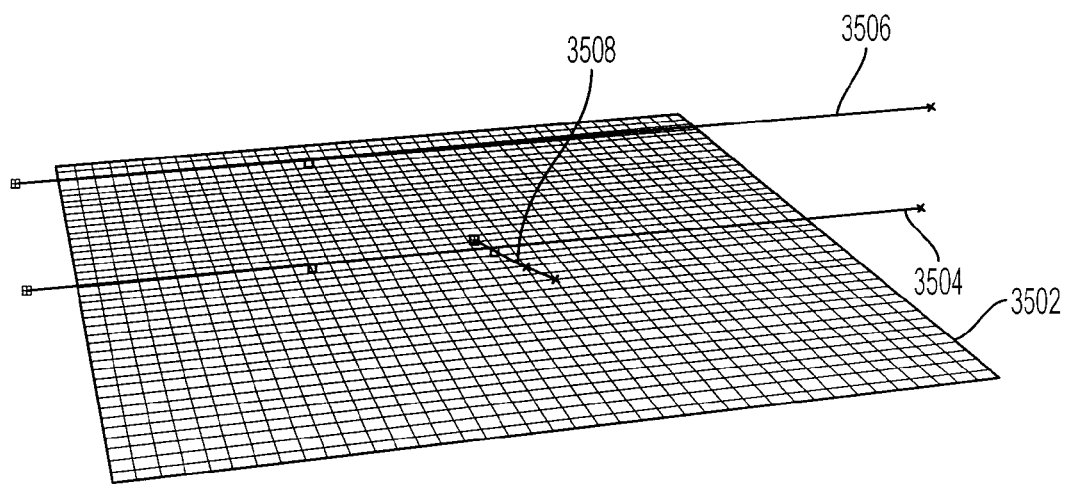
FIGS. 35-37 depict a culling example.
Figure 36:
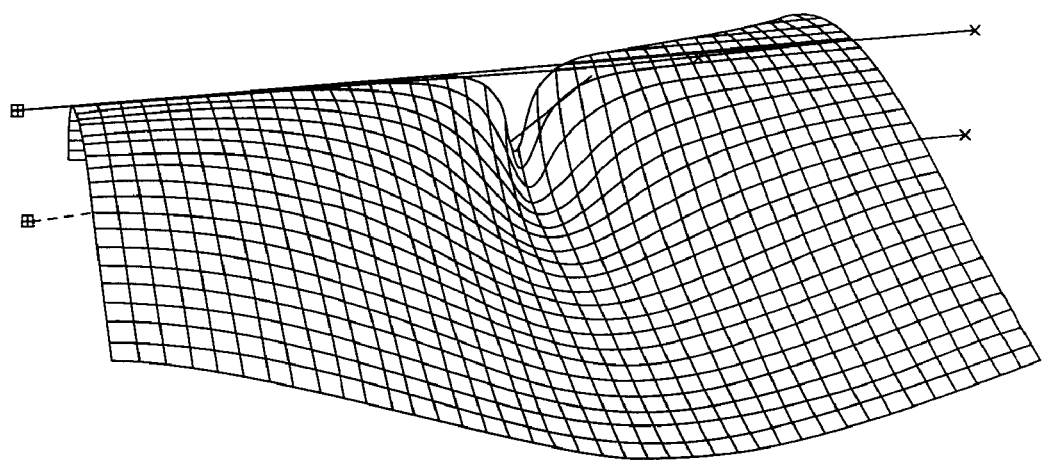
Figure 37:
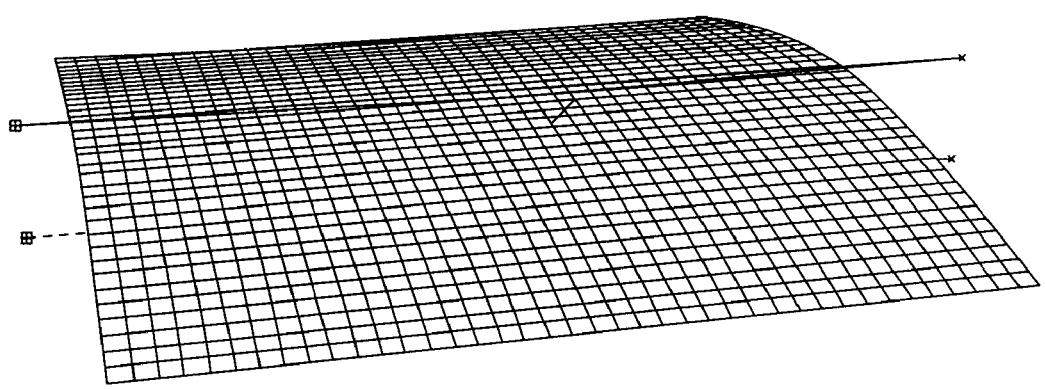

FIG. 35 shows an original setup where a surface or plane 3502 is to be deformed. The two lines 3504 and 3506 are a modifier pair (indicating that the warp must translate points on the lower line to the upper line). There is also a short constraint line or curve 3508 approximately perpendicular to the lower modifier (indicating that points along that line must not move). Where the constraint 3508 and lower modifier 3504 intersect there is a deformation contradiction (the point should move but it should remain unmoved). Generally in performing a deformation, however, each line is sampled and it is unlikely that the intersection point will be a sample. So generally, there will be nearby (as opposed to identical samples) points that have nearly contradictory deformation instructions (i.e. one sample point moves, but another very close sample point does not move). Generally, such contradictions are accidental—they are not what the user intends. FIG. 36 shows the anomalous results of a deformation based on the modifiers and constraint of FIG. 35. FIG. 37 illustrates the deformation after Laplacian culling is performed.

Figure 38:
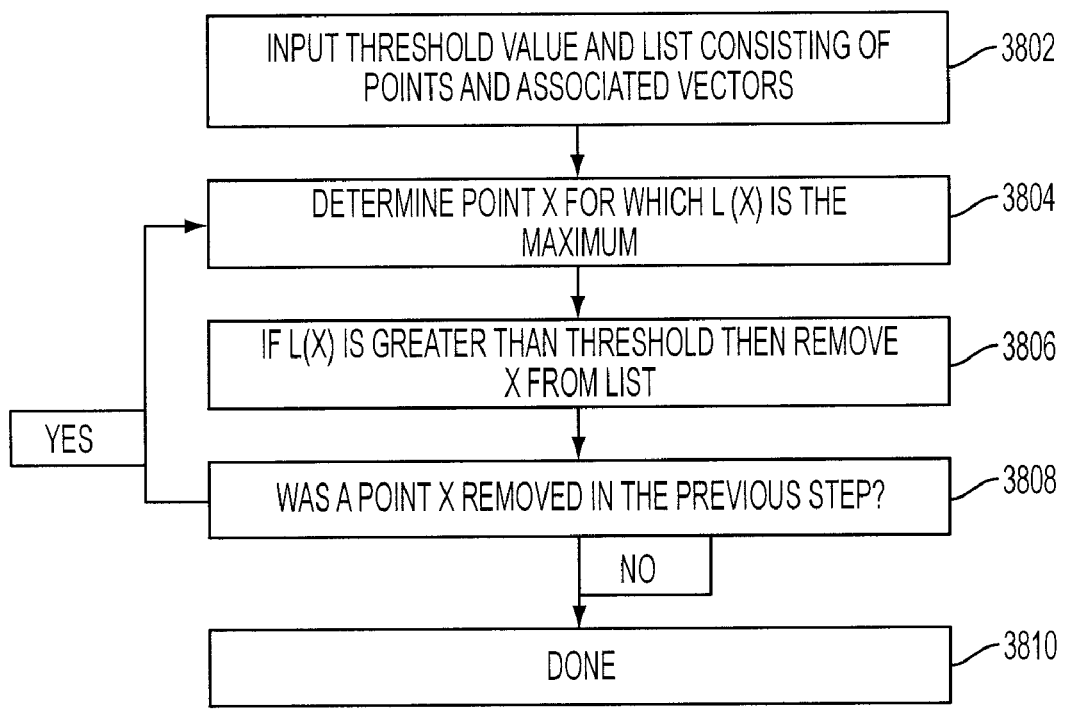
FIG. 38 shows a culling process.

The process (see FIG. 38) performed for this embodiment starts by inputting 3802 a list of sample points and associated vectors. A variable threshold is also input and is used to remove points from the list. The system then determines 3804 the Laplacian of a point on the list in accordance with the equation discussed previously. If the Laplacian is above the threshold, the point is removed 3806 from the list. If a point is removed from the list 3808, the system goes back and checks for other points that are outliers. When no more points are removed, the system is finished 3810 and the deformation can be performed.

The techniques taught herein are described in three dimensions, but they are applicable in any number of dimensions. In the two dimensional case they could be applied, for example, to image processing, where the need also exists to control image deformations in the ways described herein. The techniques taught herein are described with respect to modifying the shapes of surfaces, but are also applicable to other geometries such as curves and point clouds, and objects in arbitrary dimensions.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of deforming a model, comprising:
allowing a user to specify a deformation and select a solution from a set of solutions to fix anomalies including movement of a rigid object in the model that occur during the deformation process by a computer; and
deforming the model responsive to the deformation and the selected solution by the computer to fix the movement of the rigid object and the anomalies beyond constraint boundaries, removing the unwanted effects beyond the constraint boundaries and smoothly blending the deformation into the model beyond the constraint boundaries.

2. The method as recited in claim 1, wherein the deformation is modified by multiplication with an order-n continuity function.

3. The method as recited in claim 2, wherein the order-n continuity function is constructed as the composition of a transfer function and a fade function.

4. The method as recited in claim 3, wherein the fade function is constructed as an interpolation of a set of values.

5. The method as recited in claim 3, where the fade function is constructed as an interpolation of a set of values defined on the modifiers and constraints that define the deformation.

6. The method as recited in claim 5, where the fade function is constructed as an interpolation of a set of values defined on the modifiers and constraints that define the deformation, and the interpolated values on the modifiers are 1, the interpolated values on the tangent constraints are 0, and the interpolated values on the positional constraints are 1.

7. The method as recited in claim 3, wherein the transfer function comprises $$m_n(t) = \begin{cases} -m_n(-t) & \text{if } t < 0 \\ t^n & \text{if } 0 \le t \le 1 \\ 1 + n(t-1) & \text{if } t > 1. \end{cases}$$

8. A method of deforming a model, comprising:
allowing a user to specify a deformation and select a solution from a set of solutions to fix anomalies including movement of a rigid object in the model that occur during the deformation process by a computer; and
deforming the model responsive to the deformation and the selected solution by the computer to fix the movement of the rigid object and the anomalies beyond constraint boundaries, removing the unwanted effects beyond the constraint boundaries and smoothly blending the deformation into the model beyond the constraint boundaries,
wherein the solution set comprises:
  allowing a user to apply a clamp function to modify the deformation;
  allowing a user to apply a tangent transition function to modify the deformation;
  allowing a user to apply an order-n function to modify the deformation;
  allowing a user to apply a rigid object motion function to modify the deformation; and
  allowing a user to apply deformation contradiction diagnosis and resolution,
  wherein the clamp function is constructed as an interpolation of a set of values defined on the modifiers and constraints that define the deformation, and the interpolated values on the modifiers are 1 and the interpolated values on the constraints are 0, wherein said rigid object motion function comprises:
  allowing a user to specify a first deformation modifier of the model;
  determining a first warp of the model including the rigid object;
  determining a motion of the rigid object from the first warp;
  determining a second warp of the model responsive to the first deformation modifier and using the motion as a second deformation modifier; and
  applying the second warp to the model with the rigid object being undeformed,
  wherein the tangent transition function comprises an interpolation of a set of values 1 and 0 respectively defined on the modifiers and constraints respectively that define the deformation,
wherein the n-order function comprises the composition of a transfer function:

$$m_n(t) = \begin{cases} -m_n(-t) & \text{if } t < 0 \\ t^n & \text{if } 0 \le t \le 1 \\ 1 + n(t-1) & \text{if } t > 1 \end{cases}, \text{ and}$$

and a fade function that interpolates respectively 1,0 and 1 on respectively the modifiers, the tangent constraints, and the positional constraints,
wherein said deformation contradiction diagnosis and resolution comprises:
  allowing a user to specify a deformation modifier and a constraint position for a model;
  determining whether points associated with the modifier or constraint should be culled;
  culling the points that should be culled; and
  performing a deformation of the model responsive to the deformation modifier and the constraint position without the culled points.

* * * * *

UNITED STATES PATENT AND TRADEMARK OFFICE
CERTIFICATE OF CORRECTION

PATENT NO.         : 7,920,140 B2                                             Page 1 of 1
APPLICATION NO.    : 11/391178
DATED              : April 5, 2011
INVENTOR(S)        : Liepa et al.

It is certified that error appears in the above-identified patent and that said Letters Patent is hereby corrected as shown below:

In the Drawings
Sheet 30 of 36 (Reference Numeral 3202) (Fig. 32), Line 1 delete "CONTRAINT," and insert
-- CONSTRAINT, --, therefor.

Column 7, Line 10 after "pdf)" insert -- . --.

Signed and Sealed this
Twenty-eighth Day of June, 2011

David J. Kappos
*Director of the United States Patent and Trademark Office*